United States Patent
Cioffi et al.

(10) Patent No.: US 10,581,683 B2
(45) Date of Patent: *Mar. 3, 2020

(54) DSL SYSTEM

(71) Applicant: Adaptive Spectrum and Signal Alignment, Inc., Redwood City, CA (US)

(72) Inventors: John Cioffi, Atherton, CA (US); Wonjong Rhee, San Francisco, CA (US); Sumanth Jagannathan, Palo Alto, CA (US); Peter Joshua Silverman, Evanston, IL (US); Mehdi Mohseni, Menlo Park, CA (US); Georgios Ginis, San Mateo, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/685,522

(22) Filed: Apr. 13, 2015

(65) Prior Publication Data
US 2015/0222486 A1 Aug. 6, 2015

Related U.S. Application Data

(60) Continuation of application No. 13/214,598, filed on Aug. 22, 2011, now Pat. No. 9,203,724, which is a
(Continued)

(51) Int. Cl.
*G01R 31/08* (2020.01)
*H04L 12/24* (2006.01)
(Continued)

(52) U.S. Cl.
CPC ........ *H04L 41/0823* (2013.01); *H04L 43/106* (2013.01); *H04M 11/062* (2013.01); *H04L 41/0213* (2013.01)

(58) Field of Classification Search
USPC ....... 370/252, 235, 328, 389, 486, 201, 267, 370/268, 269, 270, 286, 318, 351, 352,
(Continued)

(56) References Cited

U.S. PATENT DOCUMENTS

| 5,479,447 A | 12/1995 | Chow et al. |
| 5,832,387 A | 11/1998 | Hee-Moon et al. |

(Continued)

FOREIGN PATENT DOCUMENTS

| CN | 1210399 | 3/1999 |
| DE | 10001150 | 7/2001 |

(Continued)

OTHER PUBLICATIONS

International Search Report and Written Opinion for International Application No. PCT/IB2006/000824, dated Aug. 31, 2006, 11pages.
(Continued)

*Primary Examiner* — Phuongchau Ba Nguyen
(74) *Attorney, Agent, or Firm* — North Weber & Baugh LLP; Michael North

(57) ABSTRACT

Methods, techniques, computer program products, apparatus, devices, etc., used in connection with DSL Management Interfaces, significantly improve the management capabilities of a DSL network and/or improve testing relating to DSL equipment and services by permitting better control and operation of a DSL system, including implementation of timestamping for more accurate measurement, monitoring and control of a system. Timestamping further allows customized data collection techniques, where a DSL line can be measured or monitored at intervals whose frequency depends on the line's stability. Moreover, data parameter read and control parameter write operations are presented in conjunction with the use of timestamping. Also, control and operation of a DSL system is enhanced by implementing
(Continued)

bit-loading that minimizes, eliminates or otherwise mitigates the amount by which the SNR margin per tone exceeds a maximum SNR margin quantity, where such bit-loading can be selected through an appropriate interface.

16 Claims, 16 Drawing Sheets

Related U.S. Application Data division of application No. 12/089,044, filed as application No. PCT/US2006/038605 on Oct. 3, 2006, now Pat. No. 8,009,665.

(60) Provisional application No. 60/839,093, filed on Aug. 21, 2006, provisional application No. 60/723,415, filed on Oct. 4, 2005.

(51) Int. Cl.
*H04M 11/06* (2006.01)
*H04L 12/26* (2006.01)

(58) Field of Classification Search
USPC ........ 370/431, 432, 464, 493, 509; 725/111, 725/119, 133, 138, 71; 348/E7.069, 348/E7.073; 713/375, 400; 718/100, 718/101, 105
See application file for complete search history.

(56) References Cited

U.S. PATENT DOCUMENTS

| | | | |
|---|---|---|---|
| 6,058,162 A | 5/2000 | Nelson et al. | |
| 6,061,427 A | 5/2000 | Ryoo | |
| 6,075,821 A | 6/2000 | Kao et al. | |
| 6,111,936 A | 8/2000 | Bremer | |
| 6,229,855 B1 | 5/2001 | Takatori et al. | |
| 6,236,714 B1 | 5/2001 | Zheng et al. | |
| 6,269,410 B1 * | 7/2001 | Spasojevic | G06F 11/3485 710/5 |
| 6,292,559 B1 | 9/2001 | Gaikwad et al. | |
| 6,327,677 B1 | 12/2001 | Garg et al. | |
| 6,345,071 B1 | 2/2002 | Hamdi | |
| 6,356,585 B1 | 3/2002 | Ko et al. | |
| 6,532,277 B2 | 3/2003 | Ulanskas et al. | |
| 6,549,520 B1 | 4/2003 | Gross et al. | |
| 6,580,727 B1 | 6/2003 | Yim et al. | |
| 6,633,545 B1 | 10/2003 | Milbrandt | |
| 6,636,603 B1 | 10/2003 | Milbrandt | |
| 6,647,058 B1 | 11/2003 | Bremer et al. | |
| 6,711,207 B1 | 3/2004 | Amrany et al. | |
| 6,744,811 B1 | 6/2004 | Kantschuk | |
| 6,785,371 B1 | 8/2004 | Olafsson | |
| 6,870,901 B1 | 3/2005 | Gudmundsson et al. | |
| 7,035,249 B2 | 4/2006 | Christensen et al. | |
| 7,106,833 B2 | 9/2006 | Kerpez | |
| 7,346,476 B2 * | 3/2008 | Levine | G06F 11/3466 700/108 |
| 7,369,596 B2 | 5/2008 | Steiger et al. | |
| 7,372,865 B2 * | 5/2008 | Scott | H04L 43/0858 370/394 |
| 7,412,371 B2 * | 8/2008 | Fisher | G09B 19/00 703/17 |
| 7,535,966 B2 * | 5/2009 | Rhee et al. | H04L 41/0853 379/90.01 |
| 7,593,458 B2 | 9/2009 | Cioffi | |
| 7,623,630 B2 | 11/2009 | Ferdosi et al. | |
| 8,009,665 B2 * | 8/2011 | Cioffi et al. | H04L 41/0823 370/352 |
| 8,031,761 B2 * | 10/2011 | Cioffi et al. | H04L 1/0002 375/222 |
| 2002/0009155 A1 | 1/2002 | Tzannes | |
| 2002/0118652 A1 | 8/2002 | Ahmed et al. | |
| 2002/0136397 A1 | 9/2002 | Zeng et al. | |
| 2002/0141443 A1 | 10/2002 | Christensen et al. | |
| 2003/0031239 A1 | 2/2003 | Posthuma | |
| 2003/0086514 A1 | 5/2003 | Ginis et al. | |
| 2003/0108191 A1 | 6/2003 | Kerpez | |
| 2003/0123560 A1 | 7/2003 | Jacobsen et al. | |
| 2003/0142667 A1 * | 7/2003 | Herring | H04L 12/2861 370/389 |
| 2004/0034875 A1 * | 2/2004 | Bulkowski | H04N 21/8173 725/136 |
| 2004/0120390 A1 | 6/2004 | Brown et al. | |
| 2004/0161048 A1 | 8/2004 | Zaleski, II et al. | |
| 2004/0230444 A1 | 11/2004 | Holt et al. | |
| 2005/0068992 A1 | 3/2005 | Kaku et al. | |
| 2005/0123027 A1 | 6/2005 | Cioffi et al. | |
| 2005/0123028 A1 | 6/2005 | Cioffi et al. | |
| 2005/0163286 A1 | 7/2005 | Jiang et al. | |
| 2005/0190826 A1 | 9/2005 | Van Bruyssel et al. | |
| 2005/0213714 A1 | 9/2005 | Lanberg et al. | |
| 2005/0220178 A1 | 10/2005 | Ginis | |
| 2005/0220179 A1 | 10/2005 | Tsatsanis | |
| 2005/0220180 A1 | 10/2005 | Barlev et al. | |
| 2005/0237940 A1 | 10/2005 | Tennyson | |
| 2005/0259725 A1 | 11/2005 | Cioffi | |
| 2006/0072722 A1 | 4/2006 | Savoor et al. | |
| 2006/0159026 A1 | 7/2006 | Wu et al. | |
| 2006/0159106 A1 | 7/2006 | Van Slyke et al. | |
| 2006/0164101 A1 | 7/2006 | Fossion et al. | |
| 2007/0280334 A1 | 12/2007 | Lv et al. | |
| 2008/0071516 A1 * | 3/2008 | Cioffi | H04L 41/145 703/21 |

FOREIGN PATENT DOCUMENTS

| | | |
|---|---|---|
| EP | 1009135 | 6/2000 |
| EP | 1213848 | 6/2002 |
| EP | 1283655 | 2/2003 |
| EP | 1337062 | 8/2003 |
| EP | 1283655 | 9/2004 |
| EP | 1699172 | 9/2006 |
| EP | 1804450 | 7/2007 |
| JP | 2000295285 | 10/2000 |
| JP | 2003338878 | 5/2002 |
| JP | 200376620 | 3/2003 |
| JP | 2003509786 | 3/2003 |
| JP | 2003274053 | 9/2003 |
| JP | 2005151371 | 11/2003 |
| JP | 2004153437 | 5/2004 |
| JP | 2004537197 | 12/2004 |
| JP | 2005057857 | 3/2005 |
| JP | 2005236854 | 9/2005 |
| WO | WO-98/59426 | 12/1998 |
| WO | WO-2001/35611 | 5/2001 |
| WO | WO-0135614 | 5/2001 |
| WO | WO-0180510 A1 | 10/2001 |
| WO | WO-2003/013109 | 2/2003 |
| WO | WO-2005/036919 | 4/2005 |
| WO | WO-2005/057315 | 6/2005 |
| WO | WO-2005/057857 | 6/2005 |
| WO | WO-2007/033579 | 3/2007 |
| WO | WO-2007044326 | 4/2007 |

OTHER PUBLICATIONS

First Official Report for Australian Patent Application No. 2006228424, dated Dec. 17, 2009, 2 pages.

Non-Final Office Action for European Application No. 04801293.4, dated May 5, 2010, 4 pages.

Non-Final Office Action for European Patent Application No. 06755837.9, dated Jun. 17, 2010, 4 pages.

Non-Final Office Action for Chinese Application No. 200480041317.4, dated Sep. 7, 2010, 10 pages.

Non-Final Office Action for China Application No. 200680007001.2, dated Aug. 19, 2010, 9 pages.

Non-Final Office Action for Chinese Patent Application No. 200680028879.4, dated Sep. 13, 2010, 14 pages.

(56) References Cited

OTHER PUBLICATIONS

European Search Report for European Patent Application No. 10179600.1, dated Oct. 26, 2010, 5 pages.
Non-Final Office Action for U.S. Appl. No. 12/089,044, dated Nov. 12, 2010, 16 pages.
Non-Final Office Action for U.S. Appl. No. 12/940,970, dated Feb. 23, 2011, 18 pages.
Office Action for European Patent Application No. 06755837.9, dated Feb. 10, 2011, 4 pages.
Office Action for Japanese Patent Application No. 2006-542048, dated Feb. 15, 2011, 3 pages.
Communication pursuant to Article 94(3) EPC for European Patent Application No. 04801293.4, dated Mar. 10, 2011, 5 pages.
Notice of Allowance for U.S. Appl. No. 12/089,044, dated Apr. 15, 2011, 20 pages.
First Office Action for Japanese Patent Application No. 2007-557625, dated May 24, 2011, 2 pages.
5th Office Action for Chinese Application No. 200480041317.4, dated Oct. 23, 2009.
Non-Final Office Action for Japanese Patent Application No. 2008-521506, dated Jul. 5, 2011, 6 pages.
Extended Search Report for European Patent Application No. 11155157.8, dated Aug. 11, 2011, 9 pages.
Song, Kee Bong, et al., "Dynamic Spectrum Management for Next-Generation DSL Systems," IEEE Communications Magazine, Oct. 2002, XP002395021, pp. 101-109.
Second Office Action for China Application No. 200680007001.2, dated Aug. 17, 2011.
Office Action from Chinese Application No. 200680028879.4, dated Aug. 29, 2011, 10 pgs.
First Office Action for Chinese Patent Application No. 200680036556.X, dated Dec. 19, 2011.
Non-Final Office Action for Canadian Patent Application No. 2,548,561, dated Jan. 9, 2012.
First Examination Report for Indian Patent Application No. 2466/CHENP/2006, dated Jan. 2, 2012.
Notice of Allowance for Chinese Patent Application No. 200480041317.4, dated Feb. 1, 2012.
Notice of Allowance for Chinese Patent Application No. 200680007001.2, dated Feb. 9, 2012.
Final Office Action for Chinese Patent Application No. 200680028879.4, dated Feb. 29, 2012.
Non-Final Office Action for Canadian Patent Application No. 2,599,895, dated Jun. 13, 2012.
Second Office Action for Canadian Patent Application No. 2,548,561, dated Aug. 13, 2012.
Non-Final Office Action for Canadian Patent Application No. 2,548,561, dated Aug. 13, 2012.
Office Action for Application No. 2,599,895 dated Jun. 13, 2012, 2 pages.
Non-Final Office Action for Chinese Patent Application No. 200680036556.X, dated Oct. 26, 2012.
Non-Final Office Action for U.S. Appl. No. 13/214,598, dated Dec. 17, 2012.
Second Examination Report for Indian Patent Application No. 2466/CHENP/2006, dated Jan. 4, 2013.
First Office Action for Japanese Patent Application No. 2011-255444, dated Jan. 22, 2013.
Extended European Search Report for European Patent Application No. 06816102.5, dated Mar. 15, 2013.
Non-Final Office Action for Canadian Patent Application No. 2,548,561, dated Apr. 8, 2013.
Non-Final Office Action for Chinese Patent Application No. 200680036556.X, dated May 16, 2013.
Notice of Allowance for European Patent Application No. 04801293.4, dated Jun. 18, 2013.
Non-Final Office Action for Canadian Patent Application No. 2,548,561, dated Apr. 8, 2013, 2 pages.
Non-Final Office Action for Canadian Patent Application No. 2,614,942, dated Sep. 9, 2013.
First Office Action for Indian Patent Application No. 1485/MUMNP/2007, dated Oct. 14, 2013.
Notice of Allowance for Japanese Patent Application No. 2011-255444, dated Oct. 28, 2013.
Notice of Allowance for Canadian Patent Application No. 2,599,895, dated Aug. 21, 2013.
Non-Final Office Action for Chinese Patent Application No. 200680028879.4, dated Jan. 28, 2014.
Notice of Allowance for Chinese Patent Application No. 200680036556.X, dated Feb. 10, 2014.
Notice of Allowance for European Patent Application No. 04801293.4, dated Mar. 6, 2014.
Final Office Action for U.S. Appl. No. 13/214,598, dated Mar. 14, 2014.
First Examination Report for Indian Patent Application No. 872/MUMNP/2008, dated Apr. 22, 2014.
Non-Final Office Action for Chinese Patent Application No. 200680028879.4, dated Jun. 23, 2014.
First Office Action for Indian Patent Application No. 175/MUMNP/2008, dated Jul. 15, 2014.
Notice of Allowance for Canadian Patent Application No. 2,614,942, dated Aug. 22, 2014.
Notice of Allowance for U.S. Appl. No. 13/214,598, dated Sep. 24, 2014.
Supplemental Notice of Allowability for U.S. Appl. No. 13/214,598, dated Nov. 10, 2014.
Decision on Reexamination for Chinese Patent Application No. 200680028879.4, dated Nov. 26, 2014.
Third Notice of Allowance for European Patent Application No. 04801293.4, dated Dec. 9, 2014.
Notice of Allowance for U.S. Appl. No. 13/214,598, dated Jan. 16, 2015.
Notice of Allowance for Canadian Patent Application No. 2,548,561, dated Feb. 3, 2015.
International Search Report and Written Opinion dated Aug. 10, 2006 for International Application No. PCT/IB2004003960. 16 pages.
International Preliminary Report on Patentablility dated Apr. 9, 2009 for International Application No. PCT/US06/038605, (dated Dec. 22, 2008), 9 pgs.
Notice of Allowance dated Mar. 2, 2009 for U.S. Appl. No. 10/893,826, 9 pages.
Non-Final Office Action for European Patent Application No. 06755837.9, dated Feb. 11, 2009, 4 pages.
Int'l Preliminary Report on Patentability for International Application No. PCT/US2006/038605, dated Jan. 8, 2009.
2nd Office Action for Chinese Application No. 200480041317.4, dated Sep. 19, 2008.
3rd Office Action for Chinese Application No. 200480041317.4, dated Apr. 10, 2009.
4th Office Action for Chinese Application No. 200480041317.4, dated Oct. 23, 2009.
Supplemental European Search Report for European Application No. 06786827.3, dated Jan. 19, 2010, 4 pages.
Non-Final Office Action for Australian Patent Application No. 2006268293, dated Feb. 10, 2010, 2 pages.
Non-Final Office Action for U.S. Appl. No. 11/995,195, dated Mar. 12, 2010,19 pages.
International Search Report for International Application No. PCT/IB2004003960, dated Aug. 10, 2006, 9 pgs.
International Search Report for International Application No. PCT/IB2006/000824, dated Aug. 31, 2006, 4 pgs.
ITU-T Recommendation G.992.1, Asymetric digital subscriber line (ADSL) transceivers, Series G, as provided by International Searching Authority, Reference No. XP-002321806 (Jun. 1999), 226-239.
Cendrillon, et al., "Optimal Multi-user Spectrum Management for Digital Subscriber Lines," 2004 IEEE International Conference on Communications; vol. 1, Jun. 20-24, 2004. ISBN: 0-7803-8533 (Jun. 2004), 5 pgs.
Chan, Vincent M. et al., "Multiuser Spectrum Optimization for Discrete Multitone Systems with Asynchronous Crosstalk," IEEE Transactions on Signal Processing, vol. 55, No. 11, Nov. 2007. University of Toronto.

(56) References Cited

OTHER PUBLICATIONS

Chung, Seong T., "Rate and power control in a two-user multicarrier channel with no coordination: the optimal scheme vs. suboptimal methods," Vehicular Technology conference, 2002, Proceedings, VTC 2002—Fall. 2002 IEEE 56th vol. 3, (Sep. 2002), 1744-1748, vol. 3.
Cioffi, John et al., "10MDSL Beyond All Goals, and Spectrally Compatible woth ADSL and VDSL, from CO or RTs," ANSI Contribution T1E1.4/2002-129, (Apr. 8, 2002), 10 pgs.
Cioffi, John et al., "Autonomous DSM Mixture of Symetric and Asymetric Service: Bi-directional Iterative Waterfilling (at Level 0 or at Level 1)," ANSI Contribution T1E1.4/2002-058R1.
Cioffi, John et al., "Autonomous Level 0 DSM Results: iterative-water-filing for ADSL," ANSI Contribution T1E1.4/2002-057, (Feb. 18, 2002), 10 pgs.
Cioffi, John et al., "Channel Identification with Dynamic Spectrum Management," ANSI Contribution T1E1.4/2001-147R1, (Nov. 5, 2001), 9 pgs.
Cioffi, John M. et al., "Channel Identification with Dynamic Spectrum Management (147)," T1E1.4: spectrum Managmenet II, ANSI Contribution T1E1.4/2001-147, May 7, 2001, XP007915695, 8 pages.
Cioffi, John et al., "Coordinated Level 2 DSM Results: Vectoring of multiple DSLs," ANSI T1E1.4/2002-059, (Feb. 18, 2002), 8 pgs.
Cioffi, John, "Draft Sections 1 and 4 proposed, Dynamic Spectrum Management," ANSI Contribution T1E1.4/2002-040R1, (Apr. 8, 2002), 4 pgs.
Cioffi, John et al., "Examples Improvements of Dynamic Spectrum Management," ANSI Contribution T1E1.4/2001-089R1, (Feb. 19, 2001), 14 pgs.
Cioffi, John et al., "Indication of Capability to Release Channel Information," ANSI Contribution T1E1.4/2002-041R1, (Apr. 8, 2002), 3 pgs.
Cioffi, John et al., "Indication of Capability to Release Channel Information," ANSI Contribution T1E1.4/2001-146R2, (Nov. 5, 2001), 3 pgs.
Cioffi, John et al., "Indication of Capability to Release of Channel Information," ANSI Contribution T1E1.4/2002-041, (May 7, 2001), 3 pgs.
Cioffi, John et al., "Indication of Capability to Release of Channel Information," ANSI Contribution T1E1.4/2002-041R3, (Aug. 19, 2002), 4 pgs.
Cioffi, John et al., "Indication of Capability to Release of Channel Information," ANSI Contribution T1E1.4/2002-041R4, (Nov. 18, 2002), 3 pgs.
Cioffi, John et al., "Indication of Capability to Release of Channel Information," ANSI Contributuion T1E1.4/2001-146R1, (May 7, 2001), 3 pgs.
Cioffi, John et al., "Iterative Waterfilling for Dynamic Spectrum Management," ANSI Contribution T1E1.4/2001-200R3, (Aug. 20, 2001), 1 pgs.
Cioffi, John et al., "Iterative Waterfilling for Dynamic Spectrum Management," ANSI Contribution T1E1.4/2001-200R5, (Nov. 5, 2001), 14 pgs.
Cioffi, John et al., "'New Technology' in Spectrum Management," ANSI Contribution T1E1.4/2002-128, (Apr. 8, 2002), 2 pgs.
Cioffi, John , "Proposal for Study of Spectrum Management for the Evolving Unbundling Architecture of DSL," ANSI Contribution TIE1.4/2001-090, (Feb. 19, 2001), 3 pgs.
Cioffi, John et al., "Proposed Scope and Mission for DSM (188)," ANSI Contribution T1E1./2001-188R2, (Aug. 20, 2001), 4 pgs.
Cioffi, John et al., "Proposed Scope and Mission for DSM (188)," ANSI Contribution T1E1.4/2001-188R4, (Nov. 5, 2001), 4 pgs.
Cioffi, John et al., "Proposed 'Stretch Goals' for 10MDSL," ANSI Contribution T1E1.4/2002-181, (Aug. 19, 2002), 6 pgs.
Cioffi, John et al., "Proposed 'Stretch Goals' for 10MDSL," ANSI Contribution T1E1.4/2002-181R1, (Aug. 19, 2002), 7 pgs.
Cioffi, John et al., "Response to 2001-273R1 using measured Verizon DSL SNRs," ANSI Contribution T1E1.4/2002-069, (Feb. 18, 2002), 15 pgs.
Cioffi, John et al., "Some proposed Section 7.1 text for ADSL fixed-margin mode," ANSI Contribution T1E1.4/2002-176, (Aug. 19, 2002), 3 pgs.
Cioffi, John et al., "Some proposed Section 7.1 text for ADSL fixed-margin mode," ANSI Contribution T1E1.4/2002-176R1, (Nov. 18, 2002), 13 pgs.
Cioffi, John , "Unbundled DSL Evolution," ANSI Contribution T1E1.4/2001-088. (Feb. 19, 2001), 6 pgs.
European Patent Office, "First Examination Report for EP Application No. 4801293.4," (Dec. 13, 2007).
Kerpez, K. et al., "Advanced DSL Management," Topics in Broadband Access; IEEE Communications Magazine Sep. 2003; vol. 41, No. 9; pp. 116-123 (8 pages). XP-001177649 (Sep. 9, 2003).
Kerpez, et al., "DSL Spectrum Management Standard," IEEE Communications Magazine; vol. 40, No. 11. XP-001141239 (Nov. 11, 2002), 116-123.
Kerpez, K. , "Jointly Optimizing DSL Spectra," ANSI Contribution T1E1.4/2002-231, (Nov. 18, 2002), 12 pgs.
Kerpez, K. et al., "Response to 2001-273R1 using Telcordia DSL Analysis," ANSI Contribution T1E1.4/2002-063R1, (Feb. 18, 2002), 3 pgs.
Le Nir, Vincent et al., "Optimal Power Allocation under Per-Modem Total Power and Spectral Mask Constraints in xDSL Vector Channels with Alien Crosstalk," ICASSP 2007, (Apr. 15, 2007).
Lesham, A. , "Dynamic FDM and Dynamic DS Power Back-Off: A Simplified DSM Algorithm for Coexistence between RT and CO based deployments," ANSI Contribution T1E1.4/2002-284, (Nov. 17, 2002), 9 pgs.
Liu, Yu-Sun et al., "Distributed Dynamic Spectrum Management for Digital Subscriber Line," Institute of Electronics, Information and Communication Engineers (IEICE), vol. E90-B, No. 3, Mar. 2007, 491-498.
International Search Report and Written Opinion for PCT International Application No. PCT/US2006/026796, dated Apr. 10, 2007, 7 pgs.
International Search Report and Written Opinion for PCT International Application No. PCT/IB2006/000824, dated Aug. 31, 2006.
International Search Report and Written Opinion for PCT International Application No. PCT/US06/38605, dated Nov. 17, 2008, whole document.
Rashdi, Adnan et al., "Spectrum Management for Digital Subscriber Lines," Student Conference on Engineering, Sciences and Technology, Publication Date Dec. 2004, 5 pages.
Rhee, W., "Multiuser Wireless Communications with Multiple Antennas," Dissertation Submitted to the Department of Electrical Engineering and the Committee on Graduate Studies of Stanford University. (Jun. 2002), 129 pgs.
Song, et al., "Dynamic Spectrum Management for Next-Generation DSL Systems," IEEE Communications Magazine, XP-001132769 (Oct. 2002), 101-109.
First Office Action for Chinese Application No. 200480041317.4, dated Mar. 7, 2008.
Notice of Allowance for U.S. Appl. No. 11/071,762, dated Aug. 1, 2008, whole document.
Yu, Wei et al., On Constant Power Water-filling, IEEE, 0-7803-7097-1/01 (2001), pp. 1665-1669.
Yu, W., "Competition and Cooperation in Multi-user Communication Environments," Dissertation Submitted to the Department of Electrical Engineering and the Committee on Graduate Studies of Stanford University, (Jun. 2002), 120 pgs.
Yu, et al., "Competitive Equilibrium in the Gaussian Interface Channel," IEEE International Symposium on Information Theory (ISIT) (Jun. 2000), 1 pgs.
Yu, W. et al., "Distributed Multiuser Power Control for Digital Subscriber Lines," IEEE Communications, Inc. XP-11065508A (Jun. 2002), pp. 1105-1115.
Yu, Wei et al., "Dual Methods for Nonconvex Spectrum Optimization for Multicarrier Systems," IEEE Transactions on Communications, vol. 54, No. 7, Jul. 2006, pp. 1310-1322.
Yu et al., "Iterative Water-filling for Gaussian Vector Multiple Access Channels," IEEE International Symposium on Information Theory (ISIT) (2001), 1 page.

(56) References Cited

OTHER PUBLICATIONS

Yu et al., "On Constant-Power Waterfilling," IEEE International Conference on Communications, ICC (Jun. 2001), 5 pgs.

* cited by examiner

| Time Marker 1 | Most recent showtime + 564 seconds |
| Time Marker 2 | Most recent DELT |
| Time Marker 3 | Most recent initialization |
| Time Marker 4 | Second most recent showtime + 30 seconds |

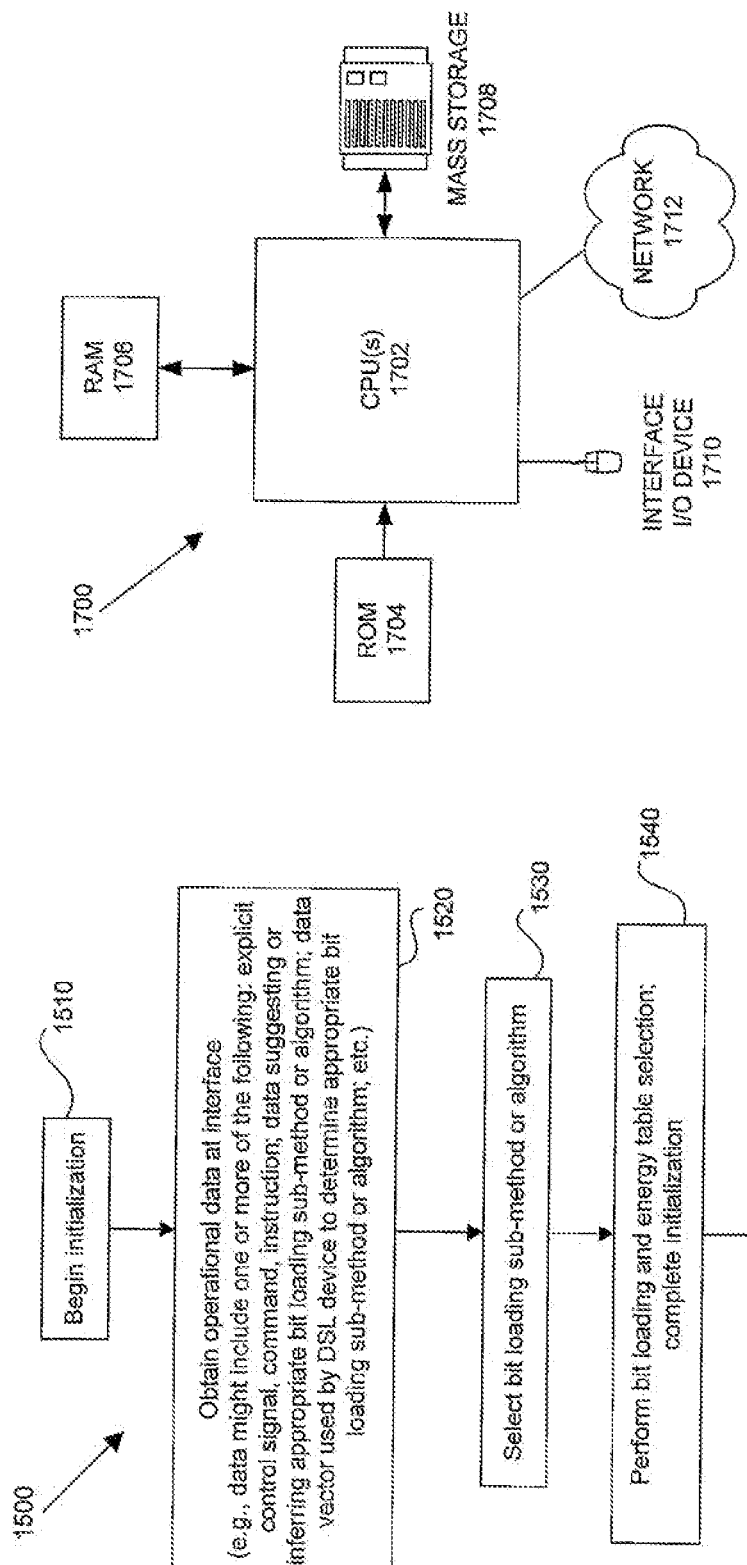

DSL SYSTEM

CLAIM OF PRIORITY

The present application is a continuation of, and claims the benefit of priority of U.S. patent application Ser. No. 13/214,598, filed Aug. 22, 2011, entitled DSL SYSTEM; which is a divisional of, and claims the benefit of priority of U.S. patent application Ser. No. 12/089,044 filed on Oct. 3, 2006, entitled DSL SYSTEM; which in turn, claims the benefit of priority to PCT Patent Application No. PCT/US2006/038605 filed on Oct. 3, 2006, entitled DSL SYSTEM; which claims the benefit of priority to U.S. Provisional No. 60/723,415 filed on Oct. 4, 2005, entitled DSL SYSTEM; and which further claims the benefit of priority to U.S. Provisional No. 60/839,093 filed on Aug. 21, 2006, entitled DSL SYSTEM; each of which are herein incorporated by reference.

The present application is related to the following: U.S. Ser. No. 10/893,826 filed 19 Jul. 2004, entitled ADAPTIVE MARGIN AND BAND CONTROL, and International Application Serial No. PCT/US2006/026796 filed 8 Jul. 2006, entitled ADAPTIVE MARGIN AND BAND CONTROL.

FIELD OF THE INVENTION

This invention relates generally to methods, systems and apparatus for managing digital communications systems. More specifically, this invention relates to managing a DSL system and/or a DSL device such as a modem, DSLAM or other component in a DSL system or the like.

DESCRIPTION OF RELATED ART

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication. In particular, asymmetric DSL (ADSL) can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

Systems, methods and techniques that improve operation in communication systems such as DSL systems would represent a significant advancement in the art. In particular, improving the level and types of data available and controllable in such communication systems would represent a considerable advancement in the field.

SUMMARY

Embodiments of the present invention, used in connection with DSL Management Interfaces, significantly improve the management capabilities of a DSL network and/or improve testing relating to DSL equipment and services. Such embodiments utilize improved methods, techniques, computer program products, apparatus, devices, etc. to permit better control and operation of a DSL system, including implementation of timestamping for more accurate measurement, monitoring and control of a system. The implementation of timestamping further allows customized data collection techniques, where a DSL line can be measured or monitored at intervals whose frequency depends on the line's stability. Additional embodiments for data parameter read and control parameter write operations are presented in conjunction with the use of timestamping. Also, control and operation of a DSL system is enhanced by implementing bit-loading that minimizes, eliminates or otherwise mitigates the amount by which the SNR margin per tone exceeds a maximum SNR margin quantity, where such bit-loading can be selected through an appropriate interface.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which:

FIG. 15 illustrates operation of a DSL system including selection of a bit loading sub-method according to one or more embodiments of the present invention.

FIG. 17 is a block diagram of a typical computer system suitable for implementing embodiments of the present invention.

DETAILED DESCRIPTION

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

As described in more detail below, a controller, such as a DSL management entity, DSL optimizer, dynamic spectrum management center (DSM Center), Spectrum Management Center (SMC), a "smart" modem, control software/hardware and/or computer system can be used to collect and analyze the operational data and/or performance parameter values as described in connection with the various embodiments of the present invention. The controller and/or other components can be a computer-implemented device or combination of devices. In some embodiments, the controller is in a location remote from the modems. In other cases, the controller may be collocated with one of or both of the modems as equipment directly connected to a modem, DSLAM or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

Figure 1:
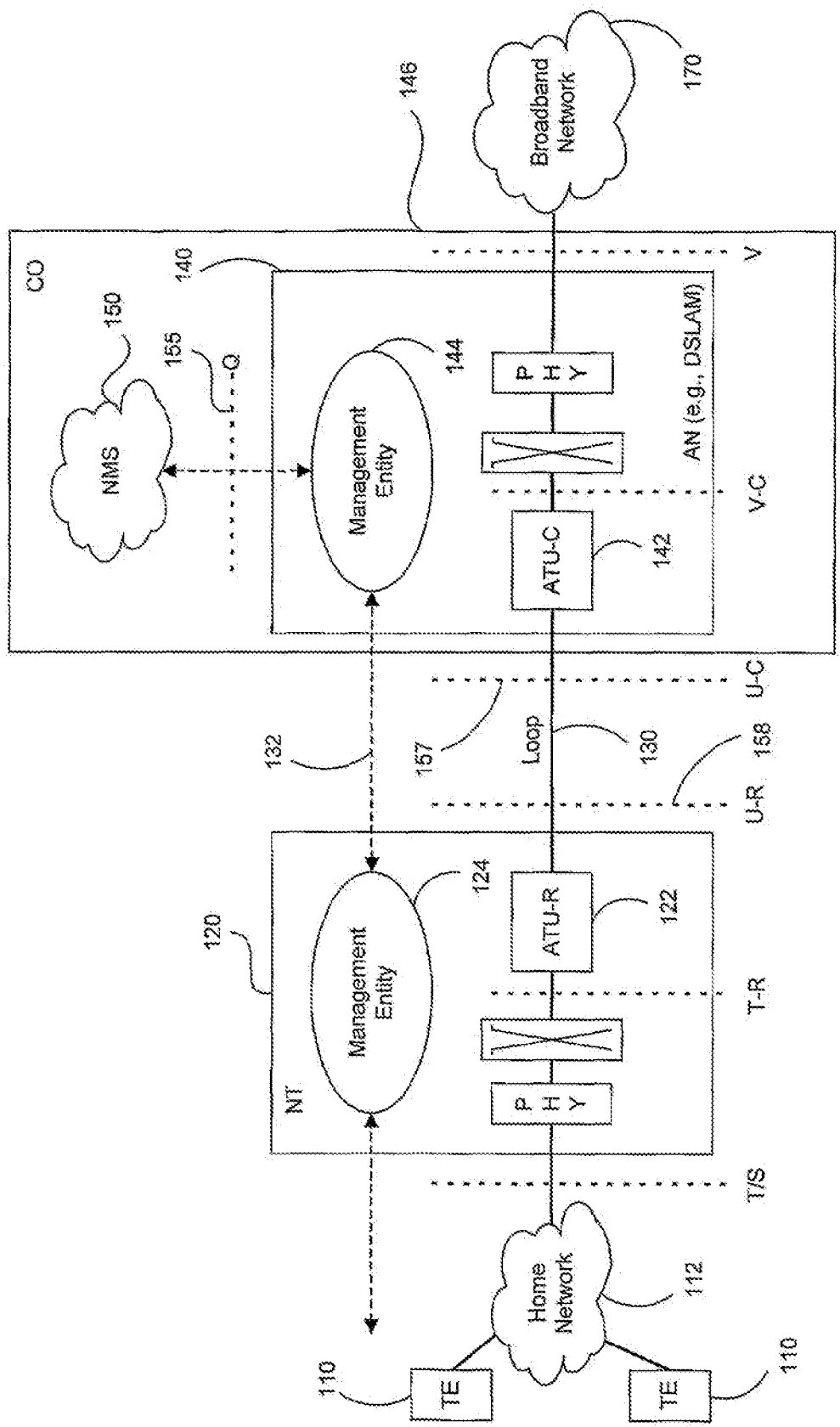
FIG. 1 is a reference model diagram from the ITU-T G.997.1 standard.
Figure 2:
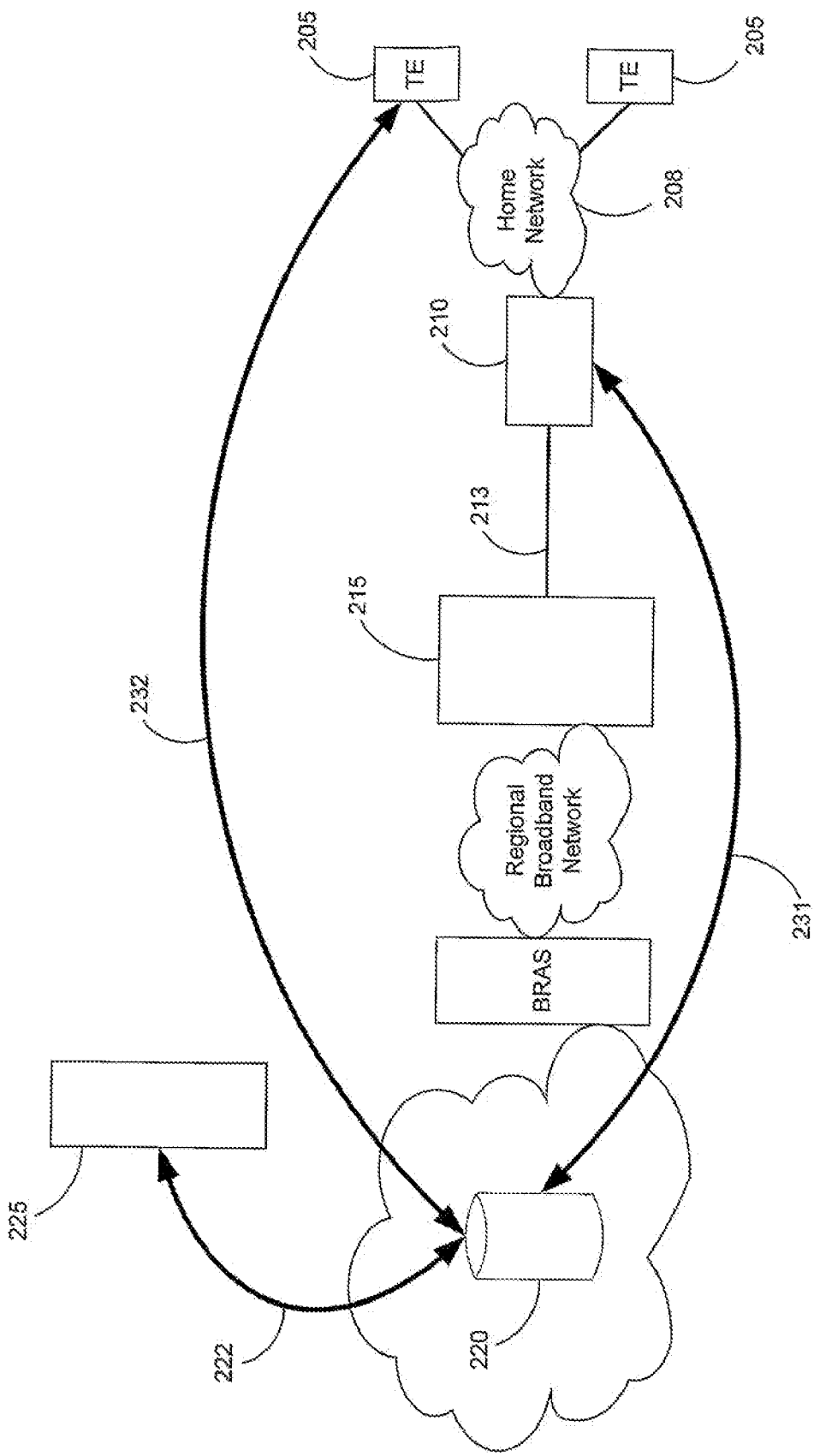
FIG. 2 is a positioning diagram from the DSL Forum TR-069 technical report.

Embodiments of the present invention can be used in ordinary DSL systems and in augmented DSL systems, as described herein and/or as suggested to those skilled in the art by the disclosure herein. Two well known systems in which the present invention can be used are shown in FIGS. 1 and 2. FIG. 1 is a reference model diagram from the ITU-T G.997.1 standard, which is well known to those skilled in the art. FIG. 2 is a positioning diagram from the DSL Forum TR-069 technical report, also well known to those skilled in the art. Because these systems are well known and understood in the art, no further detailed explanation of FIGS. 1 and 2 is provided, except in connection with the explanation of the present invention.

FIG. 1 shows the reference model system according to the G.997.1 standard (sometimes also called "G.ploam"), in which embodiments of the present invention can be implemented. This model applies to all ADSL systems meeting the various standards that may or may not include splitters, such as ADSL1 (G.992.1), ADSL-Lite (G.992.2), ADSL2 (G.992.3), ADSL2-Lite (G.992.4), ADSL2+(G.992.5), VDSL1 (G.993.1) and other G.993.x emerging VDSL standards, as well as the G.991.1 and G.991.2 SHDSL standards, all with and without bonding. This model is well known to those skilled in the art.

The G.997.1 standard specifies the physical-layer management for DSL transmission systems based on the clear embedded operation channel (EOC) defined in G.997.1 and use of indicator bits and EOC messages defined in G.99x standards. Moreover, G.997.1 specifies network-management-elements content for configuration, fault and performance management. In performing these functions, the system utilizes a variety of operational data that are available at and can be collected from an access node (AN). The DSL Forum's TR-069 report also lists the MIB and how it might be accessed.

In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL standards) or any other suitable network termination modem, transceiver or other communication unit. In the case of a VDSL system, the naming changes from ATU-R to VTU-R. In order to generally describe such a module, the naming of xTU-R is used in some instances. Each modem can be identified, for example, by manufacturer and model number. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other central location. In FIG. 1, ATU-C 142 is located at an access node (AN) 140 in a CO 146. AN 140 may be a DSL system component, such as a DSLAM or the like, as will be appreciated by those skilled in the art. In the case of a VDSL system, the naming changes from ATU-C to VTU-O. In order to generally describe such a module, the naming of xTU-C is used in some instances. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL typically is a telephone twisted pair that also carries other communication services.

Several of the interfaces shown in FIG. 1 can be used for determining and collecting performance data. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using one of the embedded channels 132 and are provided at the PMD layer, can be used to generate the required ATU-R 122 parameters in ME 144. Channels 132 are part of the management interface of G.997.1. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding DSL NMSs in DSL Forum Technical Report TR-005, entitled "ADSL Network Element Management" from the DSL Forum, dated March 1998, which is well known to those skilled in the art. Also, as noted above, DSL Forum Technical Report TR-069, entitled "CPE WAN Management Protocol" dated May 2004 is well known to those skilled in the art. Finally, DSL Forum Technical Report TR-064, entitled "LAN-Side DSL CPE Configuration Specification" dated May 2004 is well known to those skilled in the art. These documents address different situations for CPE side management. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. Additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) and Technical Report TR-106 entitled "Data Model Template for TR-069 Enabled Devices," as well as in the revision of ITU standard G.997.1 for VDSL2 MIB elements, or in the ATIS North American Draft Dynamic Spectrum Management Report, NIPP-NAI-2006-028R4. Further information may be found in DSL Forum draft working texts WT-105 entitled "Testing & Interoperability: ADSL2/ADSL2plus Functionality Test Plan" and WT-115 entitled "Testing & Interoperability: VDSL2 Functionality Test Plan" and WT-121 entitled "DSL Home Technical: TR-069 Implementation Guidelines."

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from a DSL NMS can be found therein; others are known to those skilled in the art.

FIG. 2 includes one or more CPE side devices 205 that may be coupled to a CPE modem or other DSL device 210 by a LAN 208. Modem 210 is coupled to a DSLAM or other upstream DSL device 215 by a twisted pair or other suitable DSL connection 213. DSLAM 215 can be coupled to a regional or other broadband network that includes a broadband remote access server (BRAS) or the like, as will be appreciated by those skilled in the art. An auto-configuration server (ACS) 220 can be part of and/or coupled to a network such as the Internet or the like. ACS 220 is coupled to DSLAM 215 through a regional broadband network. ACS 220 may have a "northbound" or upstream interface 222 to a controller 225 (for example, a DSL management entity, a DSL optimizer, a DSM Center, control software (which also may be inside ACS rather than coupled to it externally), etc.) and one or more "southbound" or downstream interfaces. In FIG. 2, southbound interfaces 231, 232 couple the ACS 220 to the CPE DSL device 210 and a CPE side device 205. Other interfaces according to embodiments of the present invention are possible, as discussed in more detail below.

Figure 3:
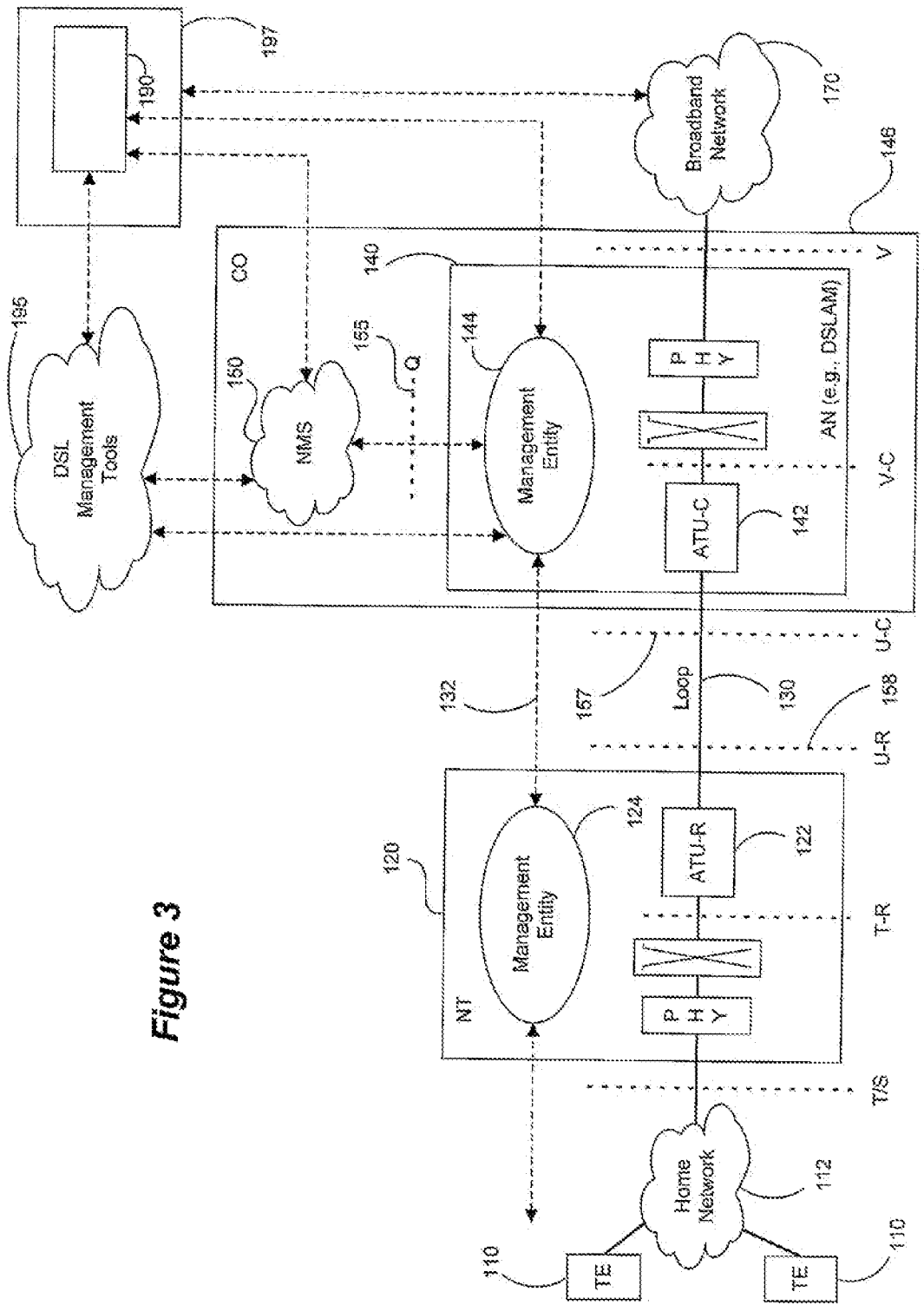
FIG. 3 is an augmented DSL system that uses the reference model of FIG. 1 as a basis.

FIG. 3 is an augmented DSL system that uses the reference model of FIG. 1 as a basis. Unlike the system of FIG. 1, the augmented system of FIG. 3 has DSL management tools and a DSL management entity coupled to the DSL system. As seen in FIG. 3, a DSL management entity 190 (for example, housed in a server 197 coupled to the broadband network 170) permits communication with various system components, such as one or more DSL devices 122, 142; one or more MEs 124, 144 in the system; the NMS 150; and/or the DSL management tools 195. The DSL management tools 195 are available to various system components as well. In FIG. 3 DSL management tools 195 are coupled to the NMS 150, ME 144 and the DSL management entity 190.

Figure 4:
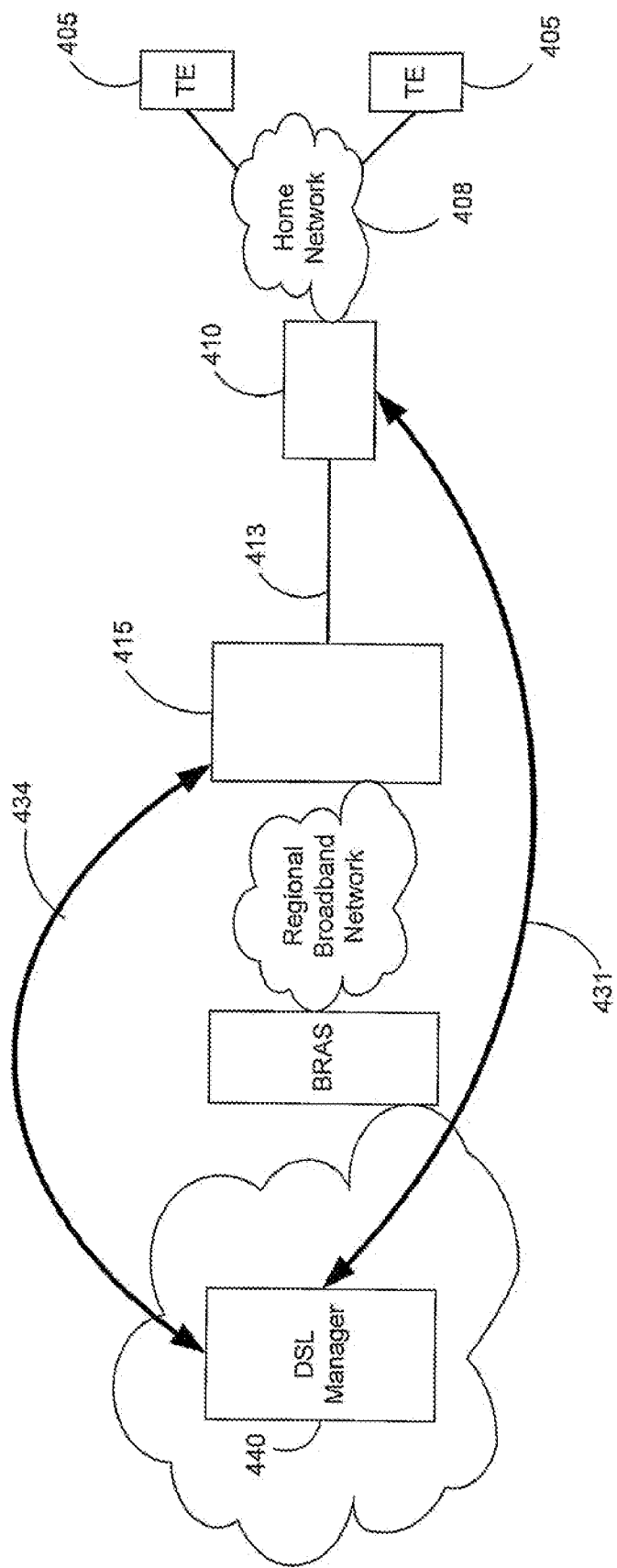
FIG. 4 is an augmented DSL system that uses the positioning diagram from the TR-069 report as a basis.

FIG. 4 is an augmented DSL system that uses the positioning diagram from the TR-069 report as a basis. FIG. 4 includes one or more CPE side devices 405 that may be coupled to a CPE modem or other DSL device 410 by a LAN 408. Modem 410 is coupled to a DSLAM or other upstream DSL device 415 by a twisted pair or other suitable DSL connection 4-13. A DSL Manager 440 (for example, a controller, DSL management entity, a DSL optimizer, a DSM Center, control software, etc.) is coupled to the DSLAM 415, for example through the Regional Broadband Network. The DSL Manager 440 may include as its components an ACS and a Service Configuration Manager, and may have one or more "southbound" or downstream interfaces. In FIG. 4, however, the southbound interfaces 431, 434 couple the DSL Manager 440 to the CPE DSL device 410 and the DSLAM 415. Other interfaces according to embodiments of the present invention are possible, as discussed in more detail below.

Figure 5A:
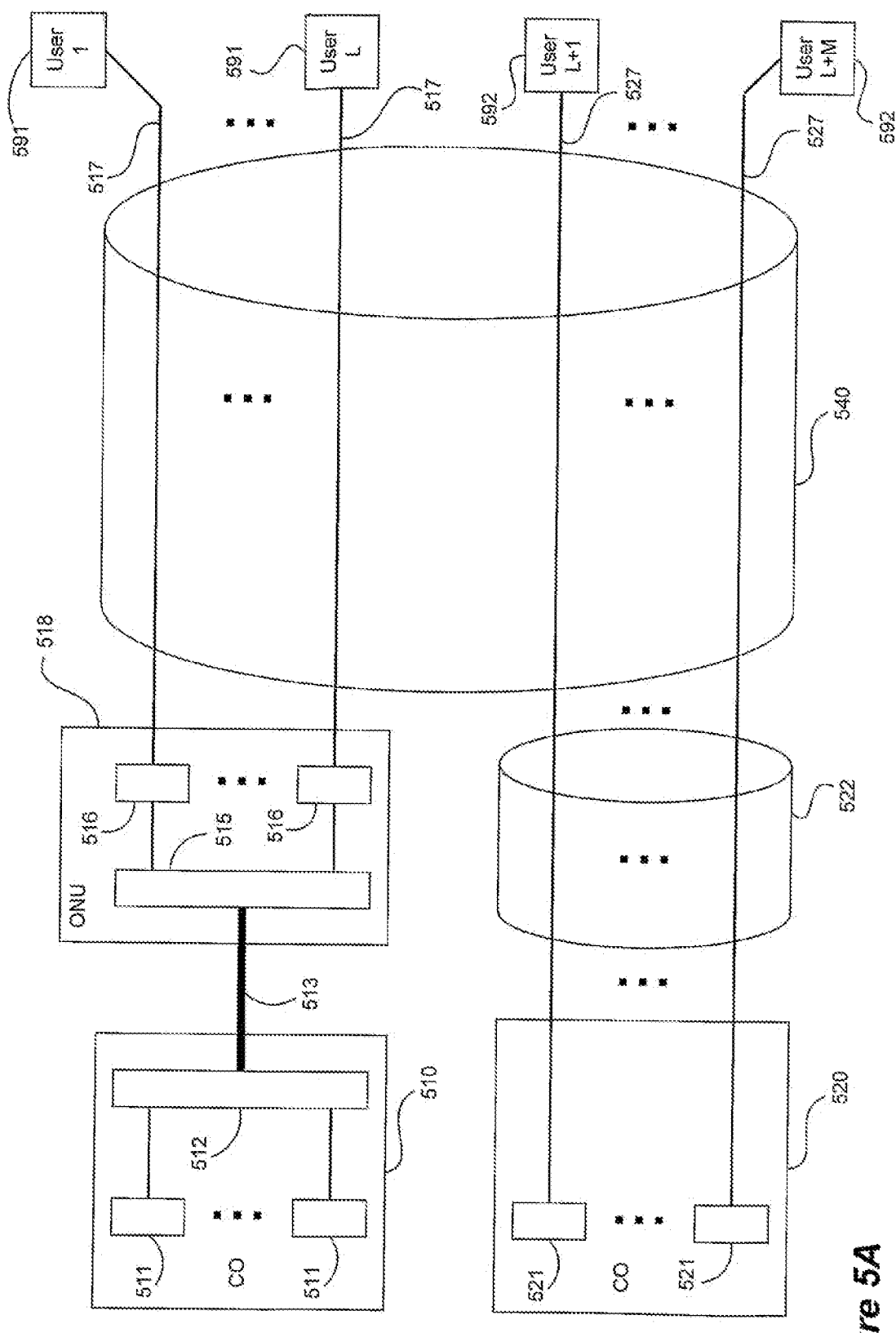
FIG. 5A is a schematic diagram illustrating generic, exemplary DSL deployment.

FIG. 5A illustrates a general schematic diagram of a DSL system, showing the layout and operation of the system. Such a layout and any other layouts wherein users communicate via CPE modems with DSLAMs and the like over actual copper plant will be referred to as a "field" system herein (as opposed to "lab" systems in which artificial topological configurations are used). In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

A generic, exemplary DSL deployment scenario is shown in FIG. 5A. All the subscriber loops of a total of (L+M) users 591, 592 pass through at least one common binder. Each user is connected to a Central Office (CO) 510, 520 through a dedicated line. However, each subscriber loop may be passing through different environments and mediums. In FIG. 5A, L customers or users 591 are connected to CO 510 using a combination of optical fiber 513 and twisted copper pairs 517, which is commonly referred to as Fiber to the Cabinet (FTTCab) or Fiber to the Curb. Signals from transceivers 511 in CO 510 have their signals converted by optical line terminal 512 and optical network terminal 515 in CO 510 and optical network unit (ONU) 518. Modems 516 in ONU 518 act as transceivers for signals between the ONU 518 and users 591.

The loops 527 of the remaining M users 592 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems for FTTEx loops. Moreover, FTTCab is expected to become an increasingly popular topology in the future. This type of topology can lead to substantial crosstalk interference and may mean that the lines of the various users have different data carrying and performance capabilities caused by the specific environment in which they operate. The topology can be such that fiber-fed "cabinet" lines and exchange lines can be mixed in the same binder.

Figure 5B:
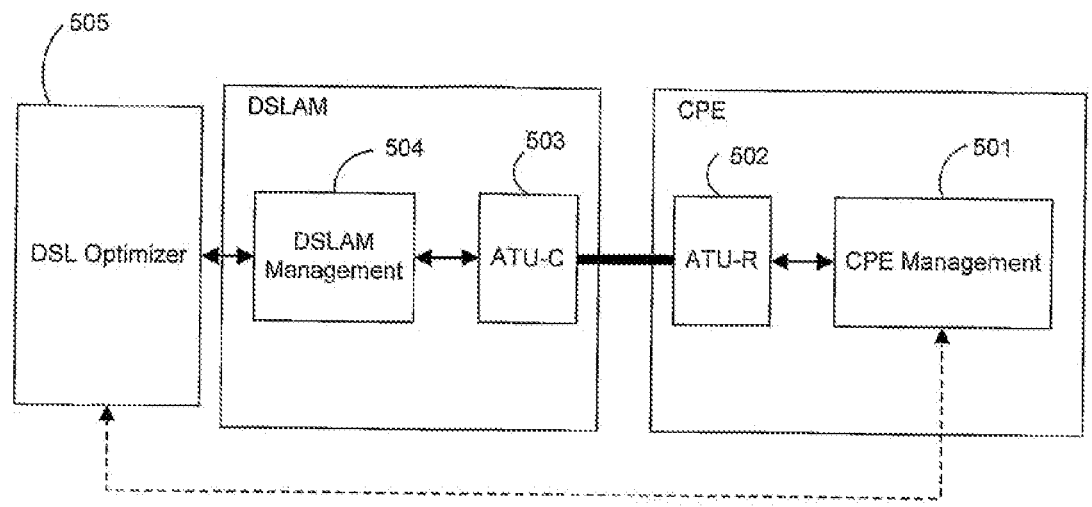
FIG. 5B is a DSL system including a DSL optimizer according to one embodiment of the present invention.

As can be seen in FIG. 5A, the lines from CO 520 to users 592 share binder 522, which is not used by the lines between CO 510 and users 591. Moreover, another binder 540 is common to all the lines to/from CO 510 and CO 520 and their respective users 591, 592. FIG. 5B illustrates one or more enhancements to the system of FIG. 5A, as discussed in more detail below.

Figure 6A:
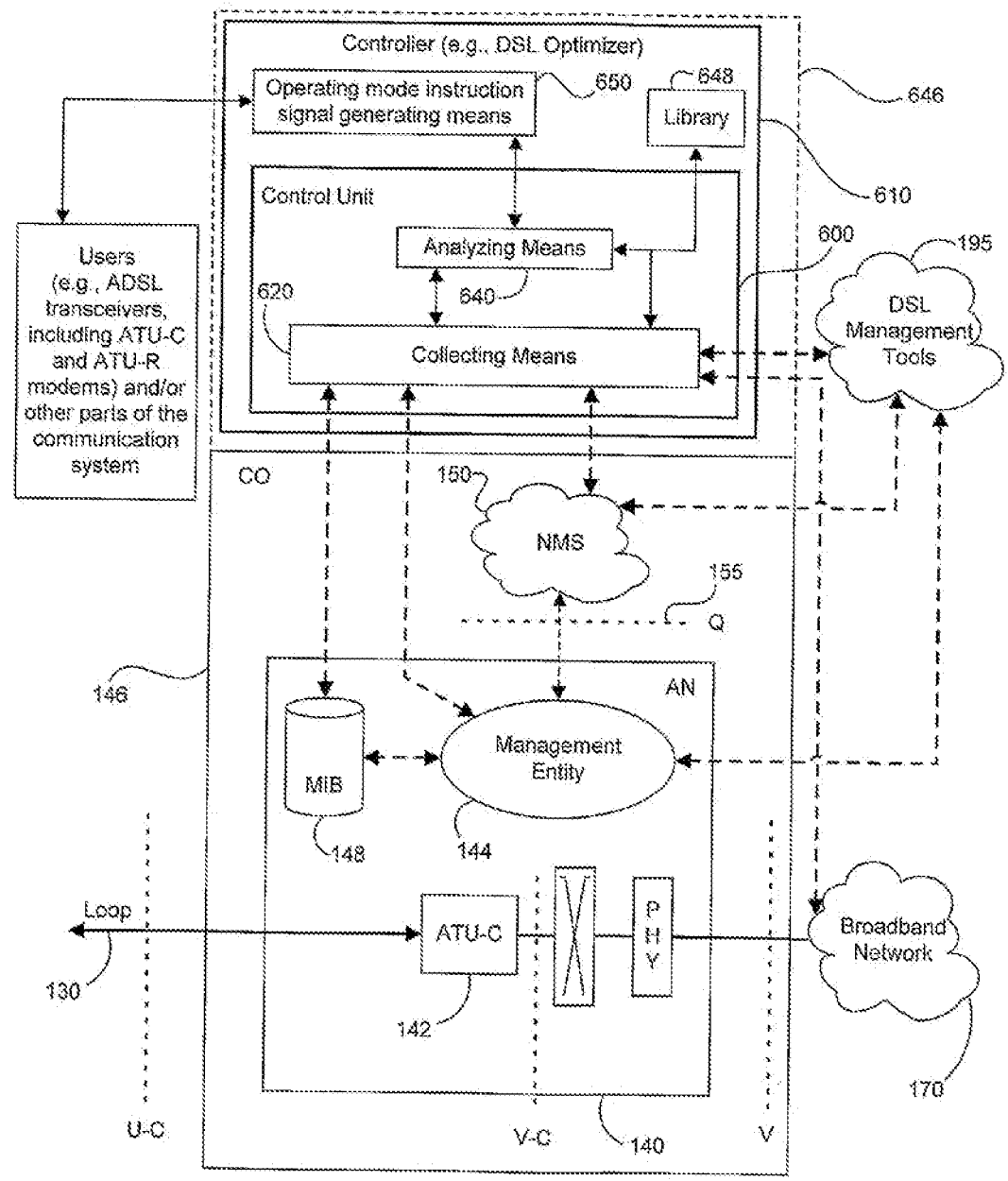
FIG. 6A is a controller and DSL system implementing one or more embodiments of the present invention.

According to one embodiment of the present invention shown in FIG. 6A, a control unit 600 may be part of an independent entity coupled to a DSL system, such as a controller 610 (for example, a DSL management entity, DSL optimizer, DSM server, DSM Center or a dynamic spectrum manager) assisting users and/or one or more system operators or providers in optimizing their use of the system. (A DSL optimizer may also be referred to as a dynamic spectrum manager, Dynamic Spectrum Management Center, DSM Center, System Maintenance Center or SMC and include and/or have access to DSL management tools.) In some embodiments, the controller 610 may be an ILEC or CLEC operating a number of DSL lines from a CO or other location. As seen from the dashed line 646 in FIG. 6A, the controller 610 may be in the CO 146 or may be external and independent of CO 146 and any company operating within the system. Moreover, controller 610 may be coupled to and/or controlling DSL and/or other communication lines in multiple COs.

The control unit 600 includes collecting means 620 and analyzing means 640. As seen in FIG. 6A, the collecting means 620 may be coupled to NMS 150, ME 144 at AN 140, the MIB 148 maintained by ME 144 and/or the DSL Management Tools 195 (which also may be coupled to or otherwise in communication with ME 144). Data also may be collected through the broadband network 170 (for example, via the TCP/IP protocol or other protocol or means outside the normal internal data communication within a given DSL system). One or more of these connections allows the control unit to collect operational data from the system, including customized data collection and collection of data parameters that are part of the present invention. Data may be collected once or over time. In some cases, the collecting means 620 will collect on a periodic basis, though it also can collect data on-demand or any other non-periodic basis (for example, when a DSLAM or other component sends data to the control unit), thus allowing the control unit 600 to update its information, rules, sub-rules, etc., if desired. Data collected by means 620 is provided to the analyzing means 640 for analysis and any decision regarding further operation of the DSL system and/or any of its components.

In the exemplary system of FIG. 6A, the analyzing means 640 is coupled to a modem and/or system operating signal generating means 650 in the controller 610. This signal generator 650 is configured to generate and send instruction signals to modems and/or other components of the communication system (for example, ADSL transceivers and/or other equipment, components, etc. in the system). These instructions may include instructions regarding acceptable data rates, transmit power levels, coding and latency requirements, etc. The instructions also may include control parameters and time-related information concerning timestamped parameters used in the instructions. The instructions may be generated after the controller 610 determines the need and/or desirability of various parameters and processes in the communication system, including embodiments of the present invention. In some cases, for example, the instruction signals can assist in improving performance for one or more customers and/or operators using the system by allowing the controller 610 to have better and/or more control over the operation of the communication system.

Embodiments of the present invention can utilize a database, library or other collection of data pertaining to the data collected, decisions made regarding relevant parameters, past decisions regarding such parameters, etc. This collection of reference data may be stored, for example, as a library 648 in (or outside of) the controller 610 of FIG. 6A and used by the analyzing means 640 and/or collecting means 620.

In some embodiments of the present invention, the control unit 600 may be implemented in one or more computers such as PCs, workstations or the like. The collecting means 620 and analyzing means 640 may be software modules, hardware modules or a combination of both, as will be appreciated by those skilled in the art. When working with a large numbers of modems, databases may be introduced and used to manage the volume of data collected.

Figure 6B:
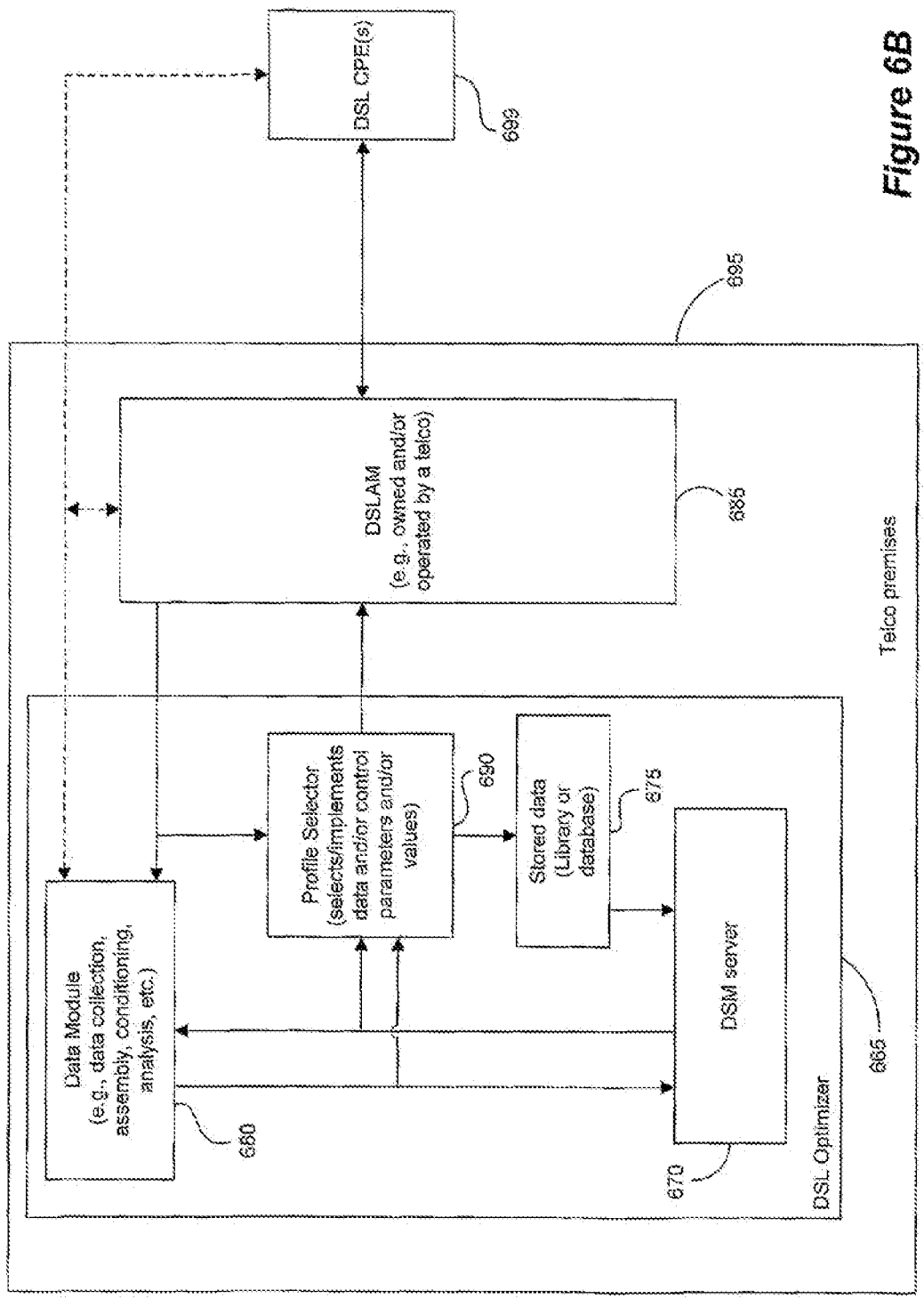
FIG. 6B is a DSL optimizer and DSL system implementing one or more embodiments of the present invention.

Another embodiment of the present invention is shown in FIG. 6B. A DSL optimizer 665 operates on and/or in connection with a DSLAM 685 or other DSL system component, either or both of which may be on the premises 695 of a telecommunication company (a "telco"). The DSL optimizer 665 includes a data collection and analysis module 680, which can collect, assemble, condition, manipulate and supply operational data for and to the DSL optimizer 665 (where, as with any embodiments of the present invention, the operational data can include performance data as well). Module 680 can be implemented in one or more computers such as PCs or the like. Data from module 680 is supplied to a DSM server module 670 for analysis. Information also may be available from a library or database 675 that may be related or unrelated to the telco. A profile selector 690 may be used to select and implement profiles such as data and/or control parameters and/or values. Profiles and any other instructions may be selected under the control of the DSM server 670 or by any other suitable manner, as will be appreciated by those skilled in the art. Profiles selected by selector 690 are implemented in the DSLAM 685 and/or any other appropriate DSL system component equipment. Such equipment may be coupled to DSL equipment such as customer premises equipment 699. The system of FIG. 6B can operate in ways analogous to the system of FIG. 6A, as will be appreciated by those skilled in the art, though differences are achievable while still implementing embodiments of the present invention.

Embodiments of the present invention, used in connection with DSL Management Interfaces, can significantly improve the management capabilities of a DSL network and/or improve testing relating to DSL equipment and services. These benefits in turn create opportunities for DSL providers to offer equipment and services with higher performance and at a lower total cost.

Embodiments of the present invention utilize improved methods, techniques, computer program products, apparatus, devices, etc. to permit better control and operation of a DSL system or similar digital communication system, both in the case of field systems and in the case of lab systems, as further explained and defined below. Various embodiments include the implementation of timestamping (that permits more accurate measurement, monitoring, control, etc. of a system), customized data collection techniques, extended parameter definitions for data and/or control parameters, and implementation of these in both field and lab settings.

Figure 7A:
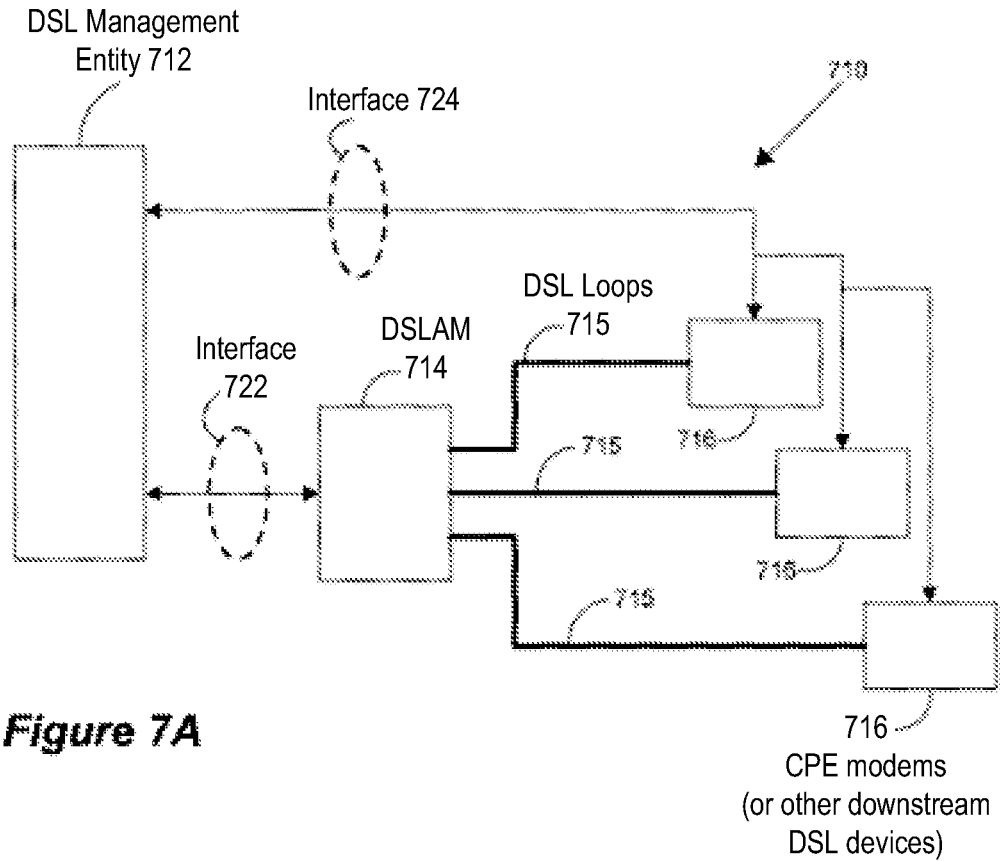
FIG. 7A illustrates interfaces between a DSL Management Entity and a DSLAM, and between a DSL Management Entity and a DSL CPE modem.

Embodiments of the present invention relate to interfaces between a DSL Management Entity and a DSLAM, and between a DSL Management Entity and a DSL CPE modem. These are illustrated in FIG. 7A. In system 710 of FIG. 7A, a DSL management entity 712 is coupled to a DSLAM (or other upstream DSL device) 714 and to one or more CPE modems (or other downstream DSL devices) 716. DSLAM 714 and modems 716 are coupled to each other via DSL loops 715. DSL management entity 712 communicates with DSLAM 714 using an interface 722. DSL management entity 712 communicates with modems 716 using an interface 724. Embodiments of the present invention define new and improved ways in which these interfaces 722, 724 can be used. Moreover, embodiments of the present invention can be used with a "field" or a "lab" communication system.

There are various current DSL management interfaces that are well known to those skilled in the art, including those in the following:

ITU-T standard G.997.1, "Physical layer management for digital subscriber line transceivers," and DSL Forum TR-069, "CPE WAN Management Protocol;"

ATIS Draft Report, "Dynamic Spectrum Management," NIPP-NAI-2005-031G.997.1 specifies the physical layer management for DSL transmission systems based on the usage of indicator bits and EOC messages defined in the G.992.x and G.993.x series of ITU-T Recommendations and the clear embedded operation channel defined in G.997.1. It also specifies Network Management elements content for configuration, fault and performance management.

Figure 7B:
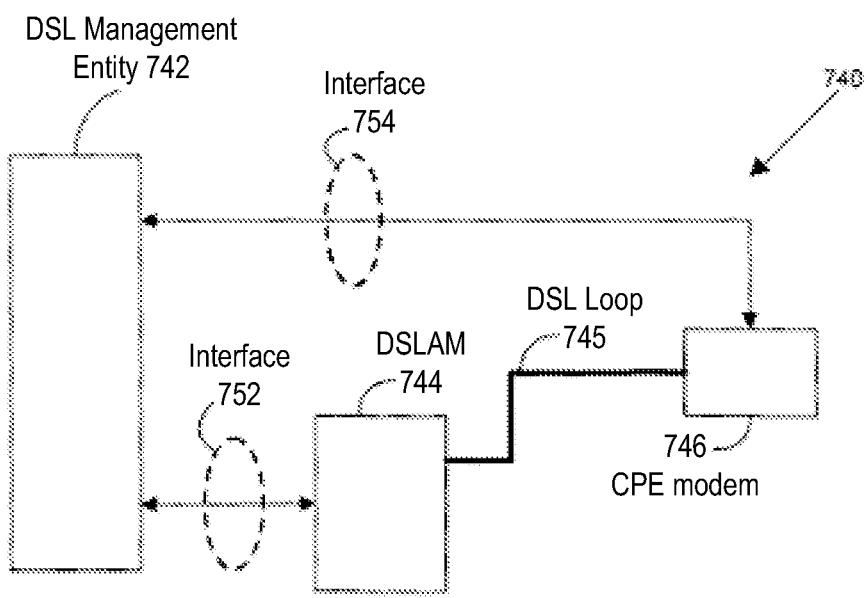
FIG. 7B illustrates interfaces between a DSL Management Entity and a DSLAM, and between a DSL Management Entity and a DSL CPE modem.

G.997.1 defines the Q interface between an Access Node (referred to at some points in the present disclosure as a DSLAM or other DSL device) and any Network Management Systems, which may be considered part of the DSL Management Entity in embodiments of the present invention. TR-069 describes the CPE WAN Management Protocol, intended for communication between a CPE and an Auto-Configuration Server (ACS), which may be considered part of the DSL Management Entity in embodiments of the present invention. These are shown in FIG. 7B, in which DSL Management Entity 742 is available to:

CPE modem 746 via interface 754; and

DSLAM 744 via interface 752. The DSLAM 744 and modem 746 are coupled to one another by DSL loop 745.

Embodiments of the present invention overcome at least some of the limitations of the interfaces defined in G.997.1 and TR-069, such as:

No dating or time identification capability for data or control parameters;

No customizable data collection for each DSL line;

Insufficient control parameters for DSL link configuration; and

Insufficient reported data parameters.

TR-069 defines a "CPE parameters" list in its Appendix B. These parameters can be accessed for reading, or (for a subset of them) for writing using the Remote Procedure Call (RPC) methods defined in Appendix A of TR-069. Examples of embodiments of the present invention focus mainly on the parameters under the following "branches" of Table 61 of TR-069:

InternetGatewayDevice.WANDevice.{i}.WAN-DSL Interface Config; and

InternetGatewayDevice.WANDevice.{i}.WAN-DSL Diagnostics. Several of the parameters under the first of the above branches are defined as holding "current" values. For example:

Upstream Attenuation

Downstream Attenuation

Upstream Power

Downstream Power

However, the definition of "current" is elusive, because multiple operations (each with considerable processing delay) are required to complete the update of these parameters. In some cases, it may be impossible for DSL equipment to update these parameters continuously. Thus, the exact length of time since the last update of these parameters is really unknown.

The parameters defined under the second of the above branches are intended to be used only after a diagnostics operation has been completed. However, most of these parameters can also be computed without a diagnostics operation. They can be derived during normal initialization of the modem, or they can even be updated during showtime. But the problem of not knowing exactly when these parameters were last computed/updated remains.

Finally, there is the problem of accessing these parameters to write to them. With existing schemes, there is no way to schedule a write operation with a known and/or specified delay. This may be desirable, for example, when multiple write parameters need to be written in a specific order.

Section 7 of G.997.1 defines Management Information Base (MIB) elements, and explains which of them can be read and written through the Q interface. Like the situation with TR-069, there are such elements for which a last update time is unknown. Specifically, most of the elements under the "Line Test, Diagnostic and Status Parameters" group (per G.997.1 Tables 7-23 and 7-24) are such that their time of computation is unclear. Such computation may have taken place during any of the following times:

Diagnostics execution
Normal initialization of modem
Normal operation of modem (showtime)

On the other hand, writing to MIB elements does not include any capability for scheduling or otherwise identifying when a control parameter might be enforced and/or implemented. There is no way to distinguish between performing a write operation and forcing an immediate re-initialization of a modem or other DSL device, and a write operation expecting the modem to adapt gracefully without exiting showtime or otherwise interrupting normal operation. Examples of elements requiring such a feature can be found under the "Line configuration profile" and "Channel configuration profile" groups (per G.997.1 Tables 7-9 to 7-12).

Beyond the limitations of the current recommendations associated with a lack of a timestamp, DSL systems may consist of multiple components, as seen in the Figures. Such components do not always share a common reference clock. When one or more data or control parameters are passed from one component to another, information regarding the time of data collection (or, for example, the time for application of a control parameter or any other time-related action) may be lost or may have to be translated into a different format or a different value. FIG. 5B exemplifies this situation, wherein parameters are exchanged among multiple entities such as a DSL optimizer 505 (or other controller such as a Spectrum Management Center, DSL Manager, Controller, DSM Center, etc.), a DSLAM Management entity 504, an ATU-C 503, an ATU-R 502, and a CPE Management entity 501. Each of the components of the DSL system of FIG. 5B may have independent clocks, may be unable to share their clocks, or may be unable to provide reliable clock information to other components for example because of interface limitations. Embodiments of the present invention address this limitation of such systems. As a result of such limitations, an interface with a timestamping facility for data and/or control parameters is needed. Furthermore, use of timestamps allows the direct computation of various inter-event durations, such as the computation of a measurement window (based on data collected on timestamps specified by the DSL optimizer) for instance between impulse noise events. In such an example, each impulse noise occurrence can be associated with a timestamp, which allows the derivation of such quantities such as the duration of an impulse noise event, the time duration between consecutive impulse noise events, and statistics of the aforementioned durations including probability distributions, averages, standard deviations, medians, minimum/maximum values, and others, as will be appreciated by those skilled in the art.

Figure 8A:
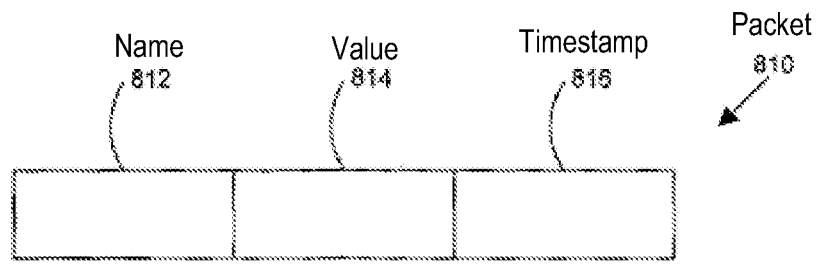
FIG. 8A shows a packet including a timestamp.

According to the present invention, a timestamp can be associated with the "CPE parameters" of TR-069 or the "MIB elements" of G.997.1 with a time indication of when they were last updated (for read-only parameters), or of when they should be enforced (for write parameters). One example of this is shown in FIG. 8A, where a packet 810 includes a timestamp 816 that is associated with the name 812 and value 814 of the operational parameter. For read-only (data) parameters, the timestamp could include one or more of the following types of information:

Was the update performed during a particular phase and/or in a specific operating mode such as diagnostics, normal initialization, or showtime?

When was update performed relative to a time reference? (for example, relative to the start of the most recent re-initialization, or relative to absolute time, which can be useful, for example, in computing measurement windows)

For write (control) parameters, the timestamp could include one or more of the following types of information:

Will the update force an initialization?

Will the update be enforced immediately, with a certain delay, or with the next initialization?

What is the delay of the update relative to a known time reference?

Figure 8B:
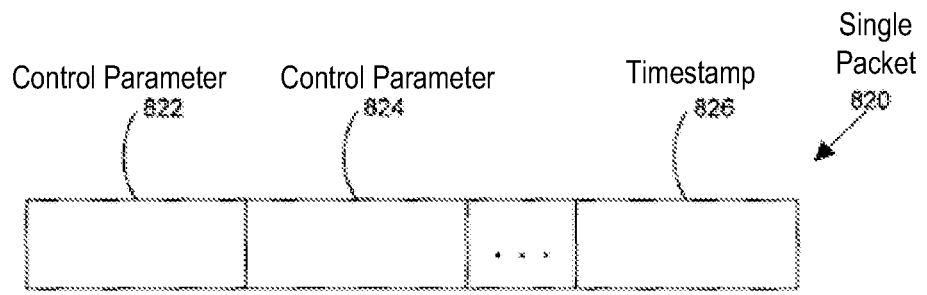
FIG. 8B shows data and/or control parameters associated with an identical timestamp grouped together in a single packet to be transferred over a DSL Management interface.

The general concept can be implemented with any of multiple approaches, as will be appreciated by those skilled in the art. In one approach, illustrated in FIG. 8B, data and/or control parameters 822, 824 associated with an identical timestamp 826 can be grouped together in a single packet 820 to be transferred over a DSL Management interface. A single timestamp thus is associated with all the parameters.

Figure 8C:
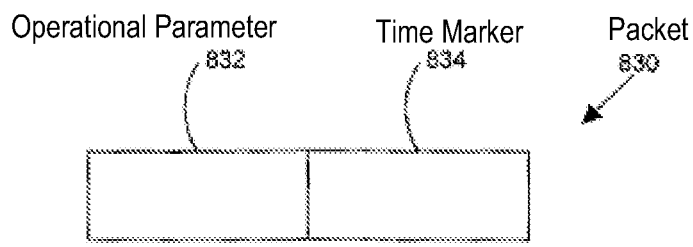
FIG. 8C shows an operational parameter associated with a time marker in a packet.

Alternatively, time markers can be defined and used to provide the timing information for the parameters. For example, in FIG. 8C an operational parameter 832 is associated with a time marker 834 in a packet 830. A number of time markers can be defined as shown in the table of FIG. 8C. Each operational parameter can then be associated with one of the pre-defined time markers. As will be appreciated by those skilled in the art, using time markers can be implemented as an extension of the TR-069 RPC methods using the following steps:

1. A new set of CPE parameters must be introduced to store Time Markers.

2. The ParameterValueStruct structure definition (per Table 11 in A.3.2.1 in TR-069) must be extended to include Time-Marker as one of the structure members, thus creating the new structure ParameterValueTimeStruct.

3. The GetParameterValues method (per A.3.2.2 in TR-069) must be enhanced to allow for ParameterValueTimeStruct elements in the ParameterList array. Whenever GetParameterValues is called to read the values of time-critical CPE parameters, the Time Markers should also be included in the ParameterList.

4. The SetParameterValues method (per A.3.2.1 in TR-069) must be enhanced to allow for ParameterValueTimeStruct elements in the ParameterList array. Whenever SetParameterValues is called to write to time-critical CPE parameters, the corresponding Time Markers should also be included in the ParameterList.

Figure 9:
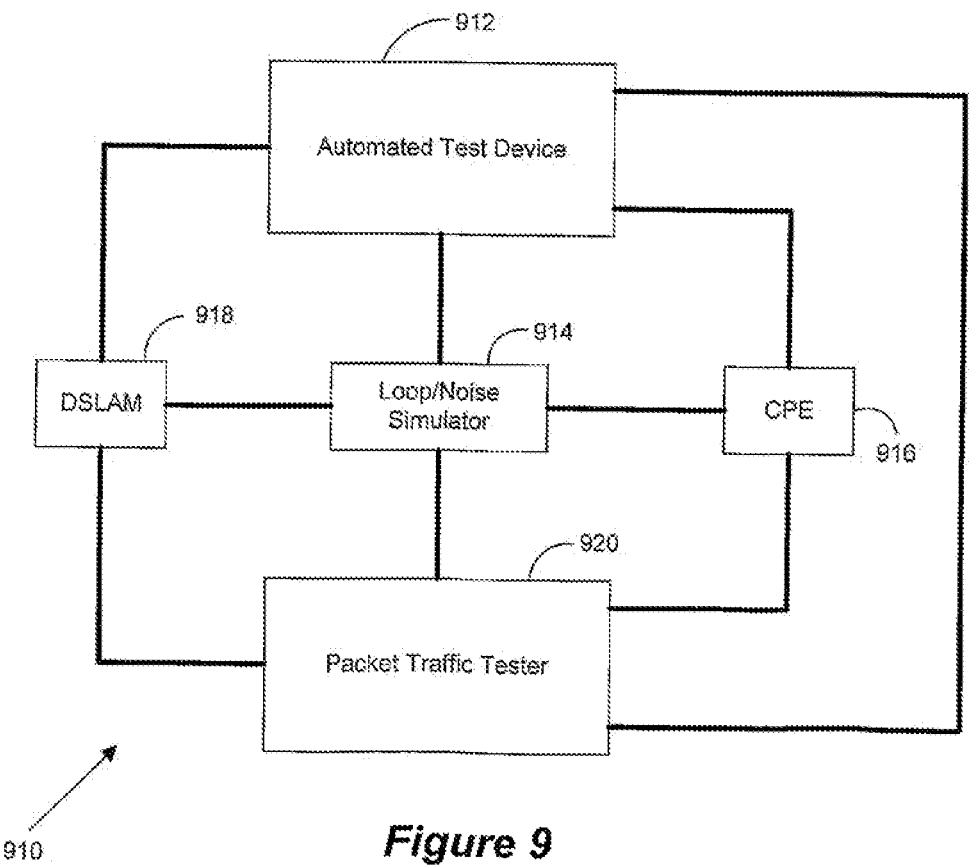
FIG. 9 is an exemplary lab DSL system.
Figures 10A, 10B:
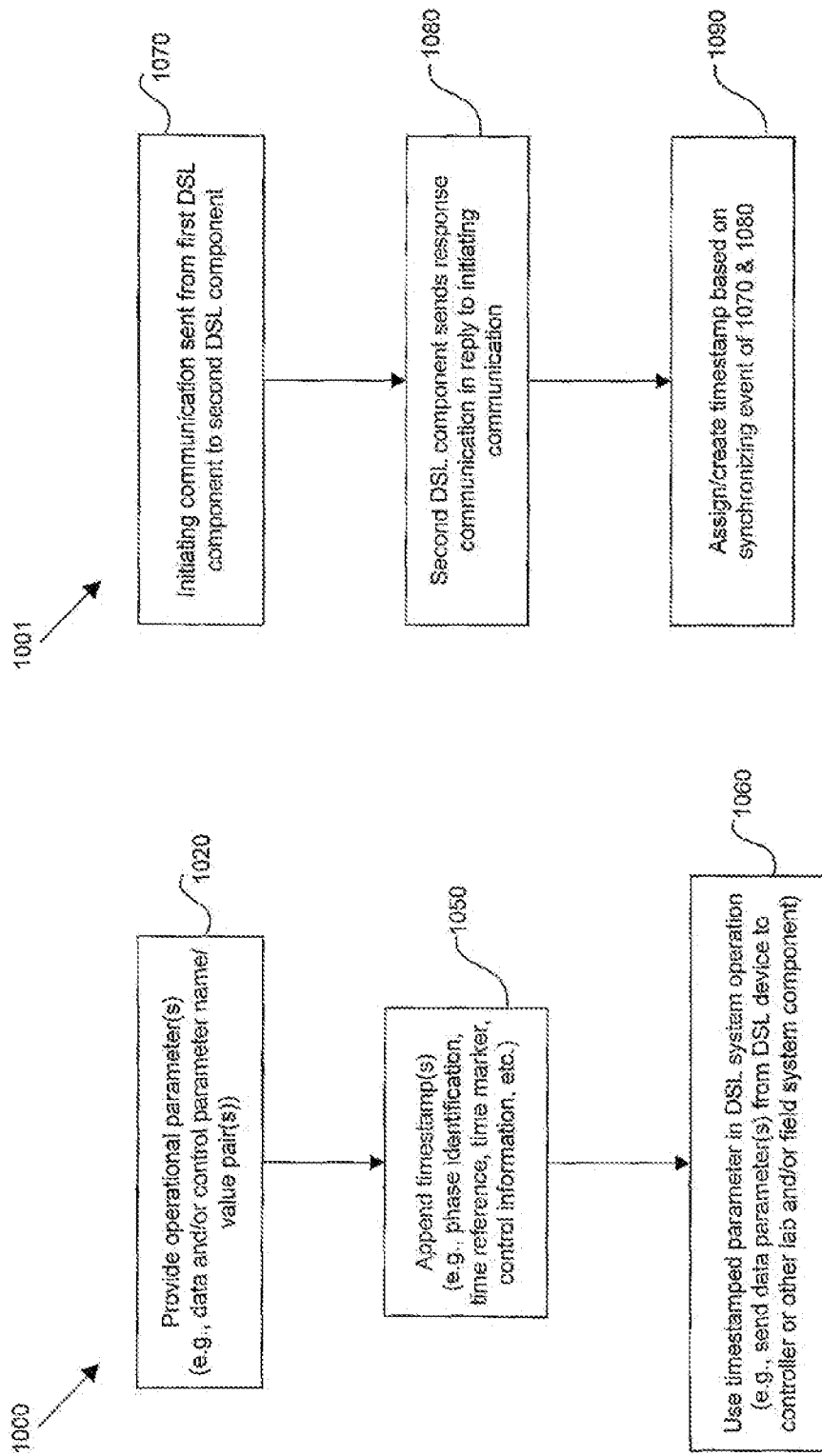
FIG. 10A illustrates operation of a DSL lab and/or field system (and/or a computer program product implementing such methods) that includes timestamping used in connection with one or more operational parameters according to one or more embodiments of the present invention.
FIG. 10B illustrates operation of a DSL lab and/or field system (and/or a computer program product implementing such methods) that includes a obtaining a timestamp using coordinating or synchronizing communications between components in a DSL system according to one or more embodiments of the present invention.

Therefore, according to some embodiments of the present invention, one or more of which are shown in FIG. 10A, a method 1000 of operating a DSL lab and/or field system (and/or a computer program product implementing such methods) can include timestamping used in connection with one or more operational parameters (for example, read, data, write, control, operational, etc. parameters). Generally, one or more operational parameters are provided at 1020 and a timestamp is appended to that/those operational parameter(s) at 1050. The operational parameter then can be used at 1060 in operating the DSL system (for example, as a data parameter or a control parameter) or can otherwise be used to assist in operating the DSL system (which can be a field DSL system, a lab DSL system such as the one shown in FIG. 9 explained in more detail below, etc.). As noted above, appending the timestamp can be implemented by associating the timestamp with the name and value of the operational parameter or in other ways described herein and otherwise apparent to those skilled in the art. The DSL devices with which the present invention can be used include (but are not limited to) modems, DSLAMs, line cards, remote terminals, line terminals, Component Management Systems, Auto-Configuration Servers, Element Management Systems and the like. Embodiments of the present invention can be implemented in DSL systems such as those shown and discussed herein and others known to those skilled in the art. This description of the timestamp applies cases where all DSL system components have a common time reference.

Where a data parameter (that is, a parameter that is read-only) is involved, the timestamp can be a phase identification and/or a time reference. A phase identification can identify an operating mode a DSL or other system was in when the data parameter was last updated or any other temporal description regarding phase of operation. Examples of operating modes include diagnostics, normal initialization, showtime, etc. A time reference can be a point in time defined by absolute time, a point relative to one or more phase transitions (for example, from initialization to showtime), a point in time defined relative to one or more phase-defined events (for example, 30 seconds after entering showtime, 564 seconds after last initialization, etc.), etc.

Where a control parameter (that is, a parameter that is written) is involved, the timestamp can be, for example, information regarding whether the update will force initialization, information regarding when the update will be enforced and/or implemented, information regarding any delay between a known time reference and the enforcement and/or implementation of the update, etc. Other useful and implementable timestamps are known to those skilled in the art. Computation of intervals between timestamps for various quantities is also then possible, for example to compute measurement windows and/or the number of events, changes or other quantities of interest during such a computed interval, as will be appreciated by those skilled in the art.

When a number of operational parameters have or are to be assigned the same timestamp, grouping of the operational parameters can be used, as noted above. For example, a number of operational parameters can be grouped together and then have a single timestamp appended to the group. In other cases, a group of timestamps can be defined and identified by time markers. Appending the timestamp to an operational parameter then can be accomplished by associating one of the defined time markers with the operational parameter.

In another embodiment of the present invention, one example of which is shown in FIG. 10B, a timestamp can be obtained using coordinating or synchronizing communications between components in a DSL system. According to method 1001, a first DSL component sends a request or other initiating communication to a second DSL component at 1070 (this request may contain a timestamp containing the current time according to the first DSL component). The second DSL component responds at 1080 with a response containing a timestamp containing the current time according to the second DSL component. The response from the second component typically is received after the initiating communication. Due to the relatively short period of time over which the second DSL component sends the response to the first DSL component, the timestamp contained in the response can be used by the first DSL component to synchronize with the second DSL component. Such a timestamp is assigned/created at 1090. Any such synchronizing event can thus be used by one or more components in the DSL system (such as those shown in the exemplary system of FIG. 5B). As will be appreciated by those skilled in the art, any other type of synchronizing event can be used to establish a point in time to act as the basis for a timestamp. In another embodiment, the second DSL component may periodically transmit a message containing a timestamp to a first DSL component, without the first DSL component sending a request to the second DSL component. Moreover, as also will be appreciated by those skilled in the art, the delay between an initiating communication and a responding communication or confirmation can be implemented so that the delay is negligible relative to the required accuracy of the timestamp (for example, a delay of minutes is negligible when the timestamp merely needs to be accurate as to a number of hours).

Another embodiment of this technique comprises a method wherein the first DSL component (for example, an ATU-C, an ATU-R, a DSLAM Management entity, a CPE Management entity, etc.) sends a series of commands to the second DSL component at 1070, after which the first component receives the corresponding response(s) at 1080. The series of commands can be as follows:

1. Request update of one or more parameters, for example "Update Test Parameters" command using the EOC channel of the ITU-T G.993.2 Recommendation (VDSL2).

2. Perform parameter read operation, for example "PMD Test Parameter Read" or "Management Counter Read" command using the EOC channel of the ITU-T G.993.2 Recommendation (VDSL2).

3. Record as timestamp at 1090 for the parameters the time at which the update request was sent. In another embodiment of the present invention, a timestamp can be obtained when a first component of the DSL system (for example, an ATU-C, an ATU-R, a DSLAM Management entity, a CPE Management entity, etc.) includes in its response to a second component of the DSL system information about the time at which parameters were measured. For example, the "PMD Test Parameter Read" responses of VDSL2 (see Table 11-26/G.993.2) may incorporate a time/date field. Such a field may apply either to a single parameter (for example, for "single read"), or to multiple parameters (for example, "multiple read," "next multiple read," "block read," etc.), where the field represents the exact time at which the one or more parameters were measured. Some reported quantities may be one or more accumulated values for measured events since the last measurement period. When both are timestamped, then the number of events per time interval can be computed as the value divided by the difference in timestamps. Furthermore, event durations and time durations between consecutive events may be derived, as well as statistics of such quantities, including distributions, averages, variances, medians, maximum and minimums. Those skilled in the art will understand that such adaptations are part of the present invention and are included within the scope of the claims that follow.

As will be appreciated by those skilled in the art, computer program products using embodiments of the present invention can include a machine readable medium and program instructions contained in the machine readable medium. The program instructions specify a method of operating a DSL system according to one or more of the methods described herein.

In TR-069, the data collection for the DSL Physical Layer parameters is performed in exactly the same way for all CPEs:

InternetGatewayDevice.WANDevice.{i}.WAN-DSL Interface Config parameters should hold current values (e.g. Downstream Noise Margin).

InternetGatewayDevice.WANDevice.{i}.WAN-DSL Diagnostics parameters should hold values from the last diagnostics session (e.g. SNRpsds).

InternetGatewayDevice.WANDevice.{i}.WAN-DSL Interface Config Stats Total parameters hold total statistics (e.g. FEC Errors since the beginning of data collection).

InternetGatewayDevice.WANDevice.{i}.WAN-DSL Interface Config Stats Showtime parameters hold statistics accumulated since the most recent showtime.

InternetGatewayDevice.WANDevice.{i}.WAN-DSL Interface Config Stats Last Showtime parameters hold statistics accumulated since the second most recent showtime.

InternetGatewayDevice.WANDevice.{i}.WAN-DSL Interface Config Stats Current Day parameters hold statistics accumulated during the current day.

InternetGatewayDevice.WANDevice.{i}.WAN-DSL Interface Config Stats Quarter Hour parameters hold statistics accumulated during the current quarter hour.

There also are parameters indicating the number of seconds since the beginning of data collection, since the most recent showtime, etc.

This approach misses the capability to adjust the data collection independently for each line. For example, for problematic or other lines, it may be desirable to be able to collect data more frequently compared to stable lines. The additional data can be used to diagnose problems and suggest solutions. On the other hand, requiring all lines to collect data very frequently typically is impractical, because it leads to much higher memory and communication bandwidth needs that are not justifiable for all lines involved.

In G.997.1, there are MIB elements for:

Line performance monitoring parameters (e.g. Errored Seconds)

Channel performance monitoring parameters (e.g. FEC corrections)

ATM data path performance monitoring parameters (e.g. HEC violations)

For these elements, counters are defined over periods of 15 minutes and of 24 hours. For Errored Seconds, Severely Errored Seconds, and Unavailable Seconds, counters are also stored for the past 16 intervals of 15 minute duration (see 7.2.7.9).

There also are MIB elements for (1) line test, diagnostics and status parameters (e.g. SNR margin downstream), and (2) channel test, diagnostics and status parameters (e.g. actual interleaving delay). These elements store only "current" values.

Finally, there are MIB elements storing threshold values for monitoring parameters. When the threshold values (defined over periods of 15 minutes and of 24 hours) are exceeded, then a "threshold report" is generated and transmitted over the Q-interface.

Like TR-069, the definition of the MIB elements in G.997.1 does not allow customized data collection for each line. It therefore is impossible to collect certain parameters at a faster rate (or to collect more data points within a given time period), so that more information can be collected for problematic lines.

Embodiments of the present invention permit customized and/or adaptive data collection to define the data collection procedure individually for each CPE, DSLAM or other DSL device. Multiple values are stored for each parameter, each corresponding to different instants in time. The times at which the parameter values are stored are programmable for each DSL device individually. Such collected parameter values can be associated with a timestamp field.

An example illustrates benefits and implementation of one embodiment of the present invention. Assume that CPE A is a stable line, which needs only occasional monitoring. Parameters (such as the SNR margin) then can be collected infrequently or on a "normal" basis (for example, every hour), simply to make sure that the line remains stable, as shown in the following table:

TABLE 1

Example of Adaptive Data Collection for stable line
CPE A (stable line)

| |
| --- |
| Value of SNR Margin at 2:00 pm |
| Value of SNR Margin at 3:00 pm |
| Value of SNR Margin at 4:00 pm |
| Value of SNR Margin at 5:00 pm |

However, if CPE B is a problematic line, closer monitoring can be used to determine the cause(s) of instability. Parameters such as the SNR margin then should be collected more frequently (for example, every quarter hour) to better pinpoint the time at which the problem arises, as shown in the following table:

TABLE 2

Example of Adaptive Data Collection for problematic line
CPE B (problematic line)

| |
| --- |
| Value of SNR Margin at 4:00 pm |
| Value of SNR Margin at 4:15 pm |
| Value of SNR Margin at 4:30 pm |
| Value of SNR Margin at 4:45 pm |
| Value of SNR Margin at 5:00 pm |

Stability of a DSL loop can be determined by measuring one or more performance parameters and comparing such parameters to predetermined thresholds. Such comparisons can be performed for any of current and/or historical data, and for downstream and/or upstream transmissions. Such performance parameters can include data rate, SNR margin, FEC errors, decoder errors, line/noise/SNR characteristics, latency path reported data, impulse noise statistics, maximum attainable data rates, retrain counts, code violations, reported DSL defects and others.

Generally, customized data collection according to the present invention may require that each parameter (or group of parameters) be associated with one or more of the following variables:

Data collection start time
Data collection period
Data collection end time, or total number of data collection points The first and third variables can be omitted in some embodiments.

Customized data collection according to the present invention can be integrated easily with TR-069 or with G.997.1, as will be appreciated by those skilled in the art. For TR-069 the following steps can be used to augment TR-069 operation:

New CPE parameters (or MIB elements) must be created for specifying customized data collection.

CPE parameters (or MIB elements) with customized data collection capability must be extended to vector types. Whenever data collection fills up a vector, either data collection must stop, or the new values must overwrite the oldest values.

Finally, "threshold reporting" can enhance data collection with TR-069. A simple way to achieve this is by modifying the Set Parameter Attributes method (per A.3.2.4 in TR-069). Currently, setting the Notification field in the SetParameterAttributesStruct structure allows the CPE to notify the DSL Management Entity of a parameter that has changed value. By including an additional field to the SetParameterAttributesStruct structure, the notification can be triggered by events such as a parameter exceeding a certain threshold. Alternatively, a notification may be sent when a parameter value falls below a threshold value. The Trigger field may have the following allowed values:

A special value indicating that the triggering event is any change of the value.

A range of threshold values for triggering a notification.

Figures 11, 12:
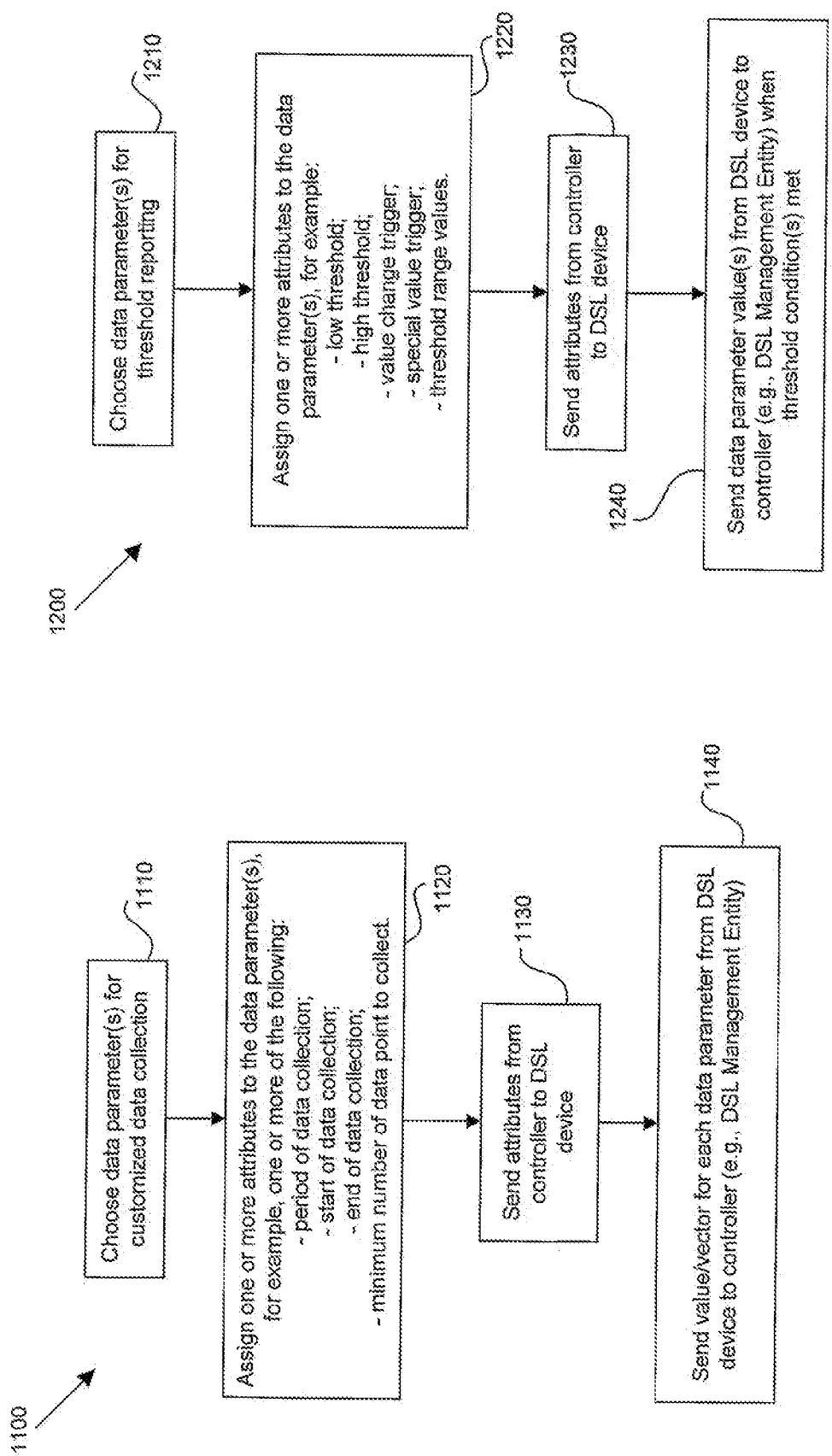
FIG. 11 illustrates adaptive data collection in a DSL loop according to one or more embodiments of the present invention.
FIG. 12 illustrates adaptive data collection in a DSL loop according to one or more embodiments of the present invention.

Methods for adaptive data collection in a DSL loop according to one or more embodiments of the present invention are shown in FIGS. 11 and 12. The method 1100 of FIG. 11 begins with the selection of one or more data parameters for customized collection at 1110, which may include evaluating performance of the DSL loop while the DSL loop is using a first data collection procedure, such as a normal data collection operation per TR-069 or G.997.1. A second data collection procedure for the DSL loop based on the evaluation of the DSL loop performance can then be determined (for example, collecting data more or less often, or collecting more or fewer data points for evaluating the loop's performance) at 1120. Once a different data collection procedure has been determined and/or defined at 1120, the attributes can be sent from a controller (for example, a DSL management entity) to a DSL device (for example, a CPE modem) at 1130 and thereafter operation of the DSL loop can be adapted at 1140 to use the second data collection procedure by sending the value/vector of values for each data parameter to the controller from the DSL device. Thus it may be the data collection frequency that is adjusted during performance of such methods.

Where threshold reporting is used, as shown by method 1200 in FIG. 12, the data parameter is chosen at 1210 and assigned one or more attributes at 1220. Again, the attributes are sent at 1230 from the controller to the DSL device, after which the data parameter value(s) are sent from the DSL device back to the controller at 1240 when the threshold conditions are met.

As will be appreciated by those skilled in the art, such methods can be applied to all the loops in a DSL binder or any other suitable group so that data collection can be appropriate on a loop-by-loop basis. Such methods can be performed by computer program products or a controller of some sort, such as a DSL optimizer, DSM Center or the like. Moreover, these methods can be extended so that one or more operational parameters may be considered and evaluated, as appropriate. For each such operational parameter, a data collection start time, collection period and end time can be designated. In some cases, as noted above, it may only be necessary to designate a data collection period for each operational parameter. The loops with which such methods are used also can be programmed and/or otherwise configured to notify a controller or the like whenever an operational parameter threshold value or range is achieved or lost, such as a maximum value, a minimum value, a sufficient change in the operational parameter value or where the operational parameter's value falls outside or within a specified range. As noted above, one or more of these methods can be implemented as an extension of TR-069 and/or G.997.1, as will be appreciated by those skilled in the art.

In TR-069, the DSL Physical Layer parameters are defined under the following branches:

InternetGatewayDevice.WANDevice.{i}.WAN-DSL Interface Config.

InternetGatewayDevice.WANDevice.{i}.WAN-DSL Diagnostics. None of these parameters can be written by a DSL Management Entity, except for InternetGatewayDevice.WANDevice.{i}. WAN-DSL Diagnostics Loop Diagnostics State, which is used to trigger DSL diagnostics.

This limitation of TR-069 implies that the only path for configuring the DSL Physical Layer of the CPE is through the means provided by G.997.1, or through the message exchange performed between a DSLAM and CPE during initialization. However, this solution is problematic in a variety of circumstances:

Broken DSLAM controls—In certain situations, it is impossible to control the CPE parameters from the DSL Management Entity due to implementation issues. There are several points where the communication path may be broken. For the path to work properly, a large number of elements need to function properly—the Q-interface must include the needed controls, the DSLAM implementation of the management portion must be complete, the message overhead path between the DSLAM and CPE must be implemented correctly, and the CPE implementation of the management portion must be complete.

Restricted set of G.997.1 CPE configuration parameters—It would be advantageous to have many of the currently CPE parameters not currently defined as programmable in G.997.1 be programmable. For example, it would be helpful to be able to program interleaved path parameters such as N, R, D, S and I.

Parameter values available too late to the CPE—Some parameters are communicated from the DSLAM to the CPE during various stages of initialization (for example, maximum SNR margin). However, the CPE may need to know these parameter values much earlier in order to optimize the link. For example, in the case of maximum SNR margin, the CPE must decide the proper transmission PSD level at an early stage.

Some G.997.1 limitations related to the DSL configuration controls of the CPE have been mentioned above. Additionally, the G.997.1 MIB elements are missing a number of configuration parameters that are valuable for DSL Management. Additional useful elements are discussed below.

Using embodiments of the present invention to improve the DSL configuration controls of the CPE, certain CPE parameters can be made programmable by a controller, such as a DSL Management Entity. In some embodiments, it may be preferable that new values for such programmable CPE parameters be associated with a timestamp, as in the earlier descriptions and as will be appreciated by those skilled in the art.

In this case, questions may arise about possible conflicts between the values programmed directly by the controller (DSL Management Entity) and the values instructed by the DSLAM. There are various ways to resolve such conflicts:

A CPE parameter can be defined to indicate whether the DSLAM values or the DSL Management Entity values have priority in cases of conflict.

If one or more values instructed by the DSL Management Entity results in a failed link, or in some other abnormal situation, then the CPE parameters can be reset and/or the link reinitialized with the DSLAM values having priority. After the link is re-established, the CPE may report the abnormal situation to the DSL Management Entity. A list of control parameters usable with a CPE modem for DSL configuration in connection with the present invention is shown in Table 3, below, which lists the parameter and comments, if any, parenthetically.

TABLE 3

Control parameters for CPE configuration

Transmission System Enabled
(Indicates which among the possible transmission systems are allowed)
Power Management State Forced
Power Management State Enabled
L0-TIME
L2-TIME
L2-ATPR
L2-ATPRT
MAXNOMPSDdn
MAXNOMPSDup
MAXNOMATPdn
MAXNOMATPup
MAXRXPWRup
PSDREF_a (Constant a for PSDREF calculation for UPBO)
PSDREF_b (Constant b for PSDREF calculation for UPBO)
PSDREF_klo (Electrical length for UPBO)
CARMASKdn
CARMASKup
PSDMASKdn
PSDMASKup
BITCAPpsdn (Bit cap definition per subcarrier)
BITCAPpsup (Bit cap definition per subcarrier)
RFIBANDSdn
RFIBANDSup
TARSNRMdn
TARSNRMup
TARSNRpsdn (Target SNR margin definition per subcarrier)
TARSNRpsup (Target SNR margin definition per subcarrier)
MINSNRMdn
MINSNRMup
MAXSNRMdn
MAXSNRMup
RA-MODEdn
RA-MODEup
RA-USNRMdn
RA-USDNMup
RA-UTIMEdn
RA-UTIMEup
RA-DSNRMdn
RA-DSNRMup
RA-DTIMEdn
RA-DTIMEup
MSGMINdn
MSGMINup
BITSdn
BITSup
GAINSdn
GAINSup
TSSIdn
TSSIup
Minimum Data Rate (Defined per bearer channel (or latency path))
Minimum Reserved Data Rate (Defined per bearer channel (or latency path))
Maximum Data Rate (Defined per bearer channel (or latency path))
Delta Data Rate (Defined per bearer channel (or latency path))
Rate Adaptation Ratio (Defined per bearer channel (or latency path))
Minimum Data Rate in Low
Power Mode (Defined per bearer channel (or latency path))
Maximum Interleaving Delay (Defined per bearer channel (or latency path))

TABLE 3-continued

Control parameters for CPE configuration

Minimum INP (Defined per bearer channel (or latency path))
Maximum BER (Defined per bearer channel (or latency path))
Data Rate Threshold Upshift
(Defined per bearer channel (or latency path))
Data Rate Threshold Downshift
(Defined per bearer channel (or latency path))
Interleaver path settings (Defined per latency path. May include RS codeword size, parity bytes, interleaver depth, interleaver period)
Trellis transmit TU-C (Trellis encoding enabled for TU-C)
Trellis receive TU-C (Trellis decoding enabled for TU-C)
Trellis transmit TU-R (Trellis encoding enabled for TU-R)
Trellis receive TU-R (Trellis decoding enabled for TU-R)
Margin-Cap Mode_ds (or band preference)
indication (Use margin-cap mode or band preference indication to choose between two loading algorithms that may be a function of other control parameters, for instance PSDMASK or BCAP or both, downstream)
Margin-Cap Mode_us (or band preference)
indication (Use margin-cap mode or band-preference indication to choose between two loading algorithms that may be a function of other control parameters, for instance PSDMASK or BCAP or both, upstream)
Request margin-cap support (ds)
(Request indication of margin-cap mode support, downstream)
Number of tones, cyclic prefix, cyclic suffix, transmitter/receiver window lengths, transmitter/receiver window coefficients, timing advance
Request margin-cap support (us) (Request indication of margin-cap mode support, upstream)

Figures 13, 14:
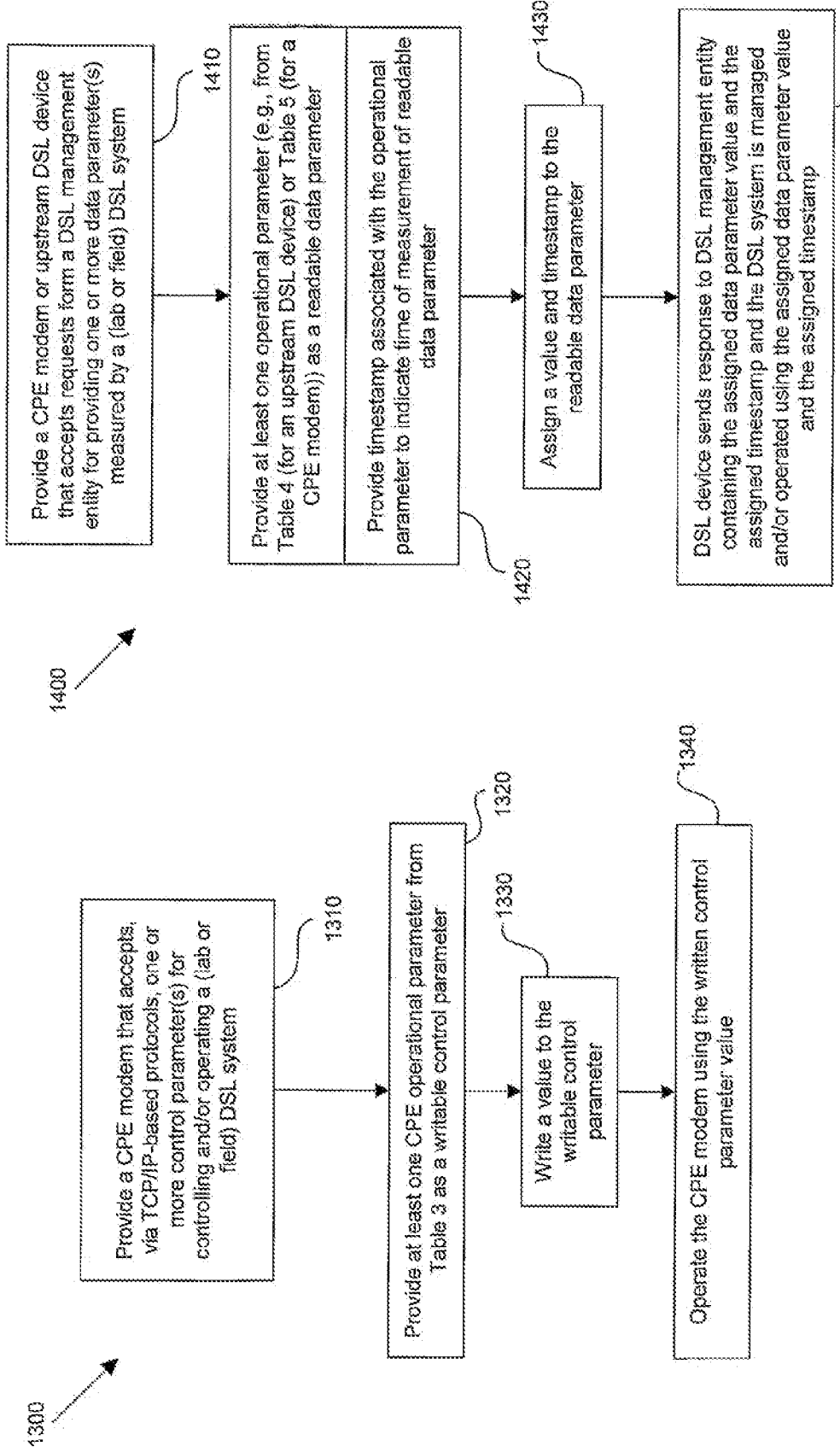
FIG. 13 illustrates control of a DSL system according to one or more embodiments of the present invention.
FIG. 14 illustrates data collection from a DSL system according to one or more embodiments of the present invention.

Therefore, using embodiments of the present invention, as shown in FIG. 13, a method 1300 for operating a DSL system may commence with providing at 1310 at least one CPE modem device that accepts, via a TCP/IP-based protocol, control parameters for controlling and/or operating the DSL system (or at least one or more DSL devices within the DSL system, which can be a lab or field DSL system). The CPE modem may also be provided with an associated timestamp. At least one operational parameter (for example, one or more of the parameters from Table 3) can be provided at 1320 as a writable control parameter for the DSL device, allowing a value to be written at 1330 to the writable control parameter to create a written control parameter value. At 1340 the DSL device may be operated using the written control parameter value. The DSL device may enforce the control parameter value at a time corresponding to the previously provided timestamp. As with the other techniques disclosed herein, the DSL device can be any suitable device, including (but not limited to) a CPE modem, a DSLAM, a remote terminal, a line terminal, a Configuration Management System, an Element Management System, or any other type of DSL modem usable in the system.

As noted above, conflicts can arise. Embodiments of the present invention can resolve conflicts between the written control parameter value and a conflicting parameter value by using any suitable prioritization scheme, such as granting priority to the written control parameter value, granting priority to the conflicting parameter value, or re-initializing a DSL loop on which the DSL device operates, where re-initializing the DSL loop can include resetting the writable control parameter to a default parameter value. Re-initializing the DSL loop also can include reporting any parameter conflict to a controller. In some instances, the default parameter value may be the conflicting parameter value.

These embodiments of the present invention can be applied to various parameters under G.997.1 and/or TR-069. As such, these methods also can be implemented as at least part of an interface between a DSL management entity and the DSL device. Various computer program products implementing one or more of the methods according to the present invention can be realized by those skilled in the art.

The CPE parameters defined in TR-069 and the G.997.1 MIB elements are missing many important data parameters that are valuable for DSL Management. Lists of data parameters usable with a CPE modem or upstream device (for example, a DSLAM) for DSL configuration in connection with the present invention are shown in Tables 4 and 5, below (as with Table 3, comments pertaining to parameters are provided parenthetically with the parameter identification).

TABLE 4

Data parameters for DSLAM monitoring

Bit swap requests upstream
Bit swaps performed downstream
Bit swaps performed upstream
ACTPSDpsdn (Actual PSD per subcarrier)
ACTPSDpsup (Actual PSD per subcarrier)
Downstream Power (Received power at CPE)
ECHOdn (Echo PSD)
ECHOup (Echo PSD)
NOISEPARdn (Noise PAR)
NOISEPARup (Noise PAR)
Interleaver path settings (Defined per latency path
Includes RS codeword size, parity bytes, interleaver depth, interleaver period, other interleaver parameters)
Framing settings (All parameters associated with framing)
Trellis downstream (Trellis coding used for downstream)
Trellis upstream (Trellis coding used for upstream)
Ndn (Number of tones)
Nup (Number of tones)
CPdn (Cyclic prefix length)
Cpup (Cyclic prefix length)
CSdn (Cyclic prefix length)
CSup (Cyclic prefix length)
TXWINLENdn (Transmitter window length)
TXWINLENup (Transmitter window length)
RXWINLENdn (Receiver window length)
RXWINLENup (Receiver window length)
TXWINdn (Transmitter window coefficients)
TXWINup (Transmitter window coefficients)
RXWINdn (Receiver window coefficients)
RXWINup (Receiver window coefficients)
Tadn (Timing advance)
Taup (Timing advance)
MCsupportdn (Downstream support of Margin-cap (or band-preference) mode response)
MCsupportup (Upstream support of Margin-cap (or band-preference) mode support)

TABLE 5

Data parameters for CPE monitoring

Transmission System Capabilities
THROUGH-C (Indicates which among the transmission systems are supported)
Transmission System Capabilities
THROUGH-R (Indicates which among the transmission systems are supported)
Chipset vendor TU-C
Chipset vendor TU-R
Modem vendor TU-C
Version number TU-C
Serial number TU-C
Self-test result TU-C
Self-test result TU-R
Loss-Of-Signal TU-C
Loss-Of-Signal TU-R
Loss-Of-Frame TU-C
Loss-Of-Power TU-C
Loss-Of-Power TU-R
No cell delineation TU-C TABLE 5-continued Data parameters for CPE monitoring Loss of cell delineation TU-C
FEC errors TU-C
FEC errors TU-R
Errored seconds TU-C
Severely errored seconds TU-C
Loss of signal seconds TU-C
Loss of signal seconds TU-R
Unavailable seconds TU-C
Unavailable seconds TU-R
Failed initialization counter
Short initialization counter
Failed short initialization counter
Delineated cell count TU-C
Delineated cell count TU-R
User cell count TU-C
User cell count TU-R
Idle cell Bit Error count TU-C
Idle cell Bit Error count TU-R
Bit swap requests downstream
Bit swap requests upstream
Bit swaps performed downstream
Bit swaps performed upstream
Power management state
Initialization success/failure cause
Last state transmitted downstream
Last state transmitted upstream
LATNdn
LATNup
ACTPSDdn
ACTPSDup
ACTPSDpsdn (Actual PSD per subcarrier)
ACTPSDpsup (Actual PSD per subcarrier)
ACTATPdn
HLINdn
HLINup
HLOGdn
HLOGup
QLNdn
QLNup
ECHOdn
ECHOup
SNRdn
SNRup
NOISEPARdn
NOISEPARup
MCsupportdn (Downstream support of Margin-cap (or band-preference) mode response)
BITSdn
BITSup
GAINSdn
GAINSup
TSSdn
TSSup
Previous data rate (Defined per bearer channel or latency path)
Actual interleaving delay (Defined per bearer channel or latency path)
Interleaver path settings (Defined per latency path; includes RS codeword size, parity bytes, interleaver depth, interleaver period, other interleaver parameters)
Framing settings (All parameters associated with framing)
Trellis downstream (Trellis coding used for downstream)
Trellis upstream (Trellis coding used for upstream)
Ndn (Number of tones)
Nup (Number of tones)
CPdn (Cyclic prefix length)
Cpup (Cyclic prefix length)
CSdn (Cyclic prefix length)
CSup (Cyclic prefix length)
TXWINLENdn (Transmitter window length)
TXWINLENup (Transmitter window length)
RXWINLENdn (Receiver window length)
RXWINLENup (Receiver window length)
TXWINdn (Transmitter window coefficients)
TXWINup (Transmitter window coefficients)

TABLE 5-continued

Data parameters for CPE monitoring

RXWINdn (Receiver window coefficients)
RXWINup (Receiver window coefficients)
Tadn (Timing advance)
Taup (Timing advance)
MCsupportup (Upstream support of Margin-cap (or band-preference) mode support)

Therefore, using embodiments of the present invention, as shown in FIG. 14, a method 1400 for operating a DSL system may commence with providing at 1410 at least one CPE modem or upstream DSL device (for example, a DSLAM) that accepts requests from a DSL management entity for providing data parameters measured by the DSL system (again, which can be a lab or field DSL system). At least one operational parameter (for example, one or more of the parameters from Table 4 or Table 5, depending on the type of DSL device) can be provided at 1420 as a readable data parameter for the DSL device. A timestamp associated with the operational parameter is also provided to indicate the time of measurement of the readable data parameter. A value is assigned at 1430 by the DSL device to the readable data parameter to create an assigned data parameter value. A timestamp is also assigned to the readable data parameter. Thereafter at 1440 the DSL device may send a response to the DSL management entity containing the assigned data parameter value and the assigned timestamp. As with the other techniques disclosed herein, the DSL device can be any suitable device, as will be appreciated by those skilled in the art, including in some cases (but not limited to) a CPE modem, a DSLAM, a remote terminal, a line terminal, a Configuration Management System, an Element Management System, or any other type of DSL modem usable in the system.

As described in more detail below, a control unit implementing one or more embodiments of the present invention can be part of a controller (for example, a DSL optimizer, dynamic spectrum manager or spectrum management center, any one of which may be part of or comprise a DSL Management Entity). The controller and/or control unit can be located anywhere. In some embodiments, the controller and/or control unit reside in a DSL CO, while in other cases they may be operated by a third party located outside the CO. The structure, programming and other specific features of a controller and/or control unit usable in connection with embodiments of the present invention will be apparent to those skilled in the art after reviewing the present disclosure.

Some of the following examples of embodiments of the present invention will use DSL systems as exemplary communications systems. Within these DSL systems, certain conventions, rules, protocols, etc. may be used to describe operation of the exemplary DSL system and the information and/or data available from customers (also referred to as "users") and/or equipment on the system. However, as will be appreciated by those skilled in the art, embodiments of the present invention may be applied to various communications systems, and the invention is not limited to any particular system. The present invention can be used in any data transmission system for which service quality may be related to control parameters.

Various network-management elements are used for management of DSL physical-layer resources, where elements refer to parameters or functions within an DSL modem pair, either collectively or at an individual end. A network-management framework consists of one or more managed nodes, each containing an agent. The managed node could be a router, bridge, switch, DSL modem or other. At least one NMS (Network Management System), which is often called the manager, monitors and controls managed nodes and is usually based on a common PC or other computer. A network management protocol is used by the manager and agents to exchange management information and data. The unit of management information is an object. A collection of related objects is defined as a Management Information Base (MIB).

Embodiments of the present invention may be used with "field" DSL systems as described above. Moreover, embodiments of the present invention may be used with "lab" systems. FIG. 9 illustrates one such lab configuration 910. Automated testing equipment 912 is coupled to a loop/noise lab simulator 914. Such lab simulators are well known in the art and various capabilities can be used for replicating actual DSL loops or groups of loops, such as DSL binders and the like. Lab simulators are hardware and/or software equipment that simulate the behavior of the transmission environment. Testing equipment 912 can be hardware and/or software that controls the other modules of lab system 910 and can collect measured data from these other devices. Device 912 also is coupled to a CPE modem 916 and a DSLAM 918, as shown in FIG. 9. Each of these devices 916, 918 is coupled to the loop/noise lab simulator to recreate a given DSL loop. Finally, a packet traffic tester 920 is coupled to devices 912, 916, 918 to allow tester 920 to collect data from these various devices. Tester 920 is hardware and/or software that generates and tests packet traffic. This can be done for both upstream (CPE to DSLAM) traffic and downstream (DSLAM to CPE) traffic.

The configuration 910 can include appropriate connections among modules, as will be appreciated by those skilled in the art. For example, the connections between the DSLAM 918 and lab simulator 914 and between the CPE modem 916 and lab simulator 914 can be short cable connections. The connections between the DSLAM 918 and packet traffic tester 920 and between the CPE modem 916 and packet traffic tester 920 can be standard interfaces and connection means. The connection between the DSLAM 918 and automated testing device 912 can use interfaces, operational parameters, etc. defined by embodiments of the present invention and/or G.997.1. Likewise, the connection between the CPE modem 916 and automated testing device 912 can use interfaces, operational parameters, etc. defined by embodiments of the present invention and/or TR-069. Finally, the connections between the lab simulator 914 and automated testing device 912 and between the packet traffic tester 920 and automated testing device 912 can be standard interfaces and connection means.

Embodiments of the present invention can be used to automate testing of DSLAM and CPE equipment. Such techniques can make use of the interfaces defined by aspects of the present invention discussed herein, TR-069 and/or G.997.1. As explained below, use of the present invention is particularly advantageous in such testing in a lab system setting. One configuration for automated testing of DSL equipment is shown in FIG. 9.

Many DSL equipment tests can be defined by the following steps:

(a) Configure the lab simulator;
(b) Configure the DSLAM and CPE modem(s);

(c) Configure the packet traffic tester (necessary in some tests only); and (d) Collect data from the DSLAM and the CPE modem(s). Steps (b) and (d) may be repeated during the same test. Other variations on these methods will be apparent to those skilled in the art.

The configuration of FIG. 9 can be used to automate the process of testing DSL equipment. The automated test device 912 is used to control and coordinate the steps taken during each test. As will be appreciated by those skilled in the art, various tests can be performed to evaluate equipment and techniques that might arise in a "field" system setting and to verify the capabilities of different types of equipment.

Specifically, for each test, the automated test device performs the following:

Sends commands to the lab simulator to specify the loop and noise conditions;

Uses control parameters of the present invention, G.997.1 and/or TR-069 to configure the DSLAM and CPE modem(s) as specified in the test definition;

Sends commands to the packet traffic tester to commence traffic generation and testing;

Uses the data parameters of the present invention, G.997.1 and/or TR-069 to collect measurements from the DSLAM and CPE modem(s).

After conclusion of the test, the collected measurements can be compared against expected values to produce a pass or fail result. In other cases, the collected measurements can be used for other purposes, as will be appreciated by those skilled in the art.

Embodiments of the present invention possess a number of advantages as compared with other methods for verification testing. Significant benefits can be realized in the approach described above through the use of the interfaces and/or operational parameters of the present invention, G.997.1 and/or TR-069 for:

Configuring the control parameters of the DSLAM and CPE; and

Collecting data parameters from the DSLAM and CPE. The use of the present invention for the above purposes is particularly advantageous for various reasons, some of which are outlined below.

Advantage 1—Single interface—An alternative approach for accessing the control and data parameters of the DSLAM and CPE modem(s) is to use proprietary interfaces of the corresponding DSLAM and CPE modem(s). This is less attractive than using the known interfaces of the present invention, G.997.1 and/or TR-069, since these known interfaces avoid the issues of supporting multiple proprietary interfaces.

Advantage 2—Timestamp capability—Among the standardized interfaces, neither G.997.1 nor TR-069 has a timestamp capability described above (for example, to specify the time of data collection, or the time of application of control parameters). The present invention overcomes this obstacle, which significantly facilitates verification testing.

Advantage 3—Customized data collection capability—Compared to G.997.1 and TR-069, the present invention has available the extra capability of customized data collection, which means that data collection can be tailored to fit the needs of each verification test. Data parameters can be collected at just the right frequency, thus avoiding collecting too much data on one hand, or collecting data too infrequently on the other hand.

Advantage 4—Extended sets of data and control parameters—Compared to G.997.1 and TR-069, the present invention has many additional control and data parameters. This boosts the capabilities of the automated test device to configure the DSLAM and CPE modem(s) for verification testing. It also enhances the set of measurements that can be obtained from the DSLAM and CPE modem(s), thus making possible the automation of many more verification tests.

Other embodiments of the present invention include a modem or other DSL device (for example, a DSLAM) using a bit and energy table loading sub-method (for example, an algorithm or other similar process) selected from a group of available sub-methods based on some observed behavior or other operational data that is obtained by the DSL device, either via an explicit command or via information about the environment (for example, including all other control parameters). The DSL device chooses its bit loading sub-method for initialization, which can include attempting to comply with maximum SNR margin constraints imposed and/or desired in the system in which the DSL device operates (a DSL loop, DSL system, DSL network, which may or may not include a DSL manager of some sort). In some cases, one of the available bit loading sub-methods might be a bit loading sub-method required, suggested, recommended, etc. by a DSL or other communications standard.

As is well known to those skilled in the art, DSL systems are required to maintain a probability of bit error smaller than a certain threshold value (termed a bit error rate, or BER, typically $10^{-7}$). DSL systems based on discrete multi-tone (DMT) technology (for example ADSL1, ADSL2/2+, VDSL1 and VDSL2) transmit information over a large number of tones (also referred to as sub-carriers). As discussed in more detail below, one signal-to-noise (SNR) margin can be calculated for an entire DSL system and another SNR margin calculated for a single DSL tone.

The SNR margin of a DSL system is the maximum factor by which noise can be increased over all tones and still maintain a probability of bit error smaller than the threshold value for the information bits transmitted over all tones. The SNR margin can be practically approximated as the minimum over all tones of the per-tone SNR margin (also known as worst-case SNR margin). In some cases, the noise can be replaced in the margin definition by another value, for example a minimum-mean-square distortion or error signal that includes effects of imperfect modem implementation.

The SNR margin of a single DSL system tone is the maximum factor by which noise can be increased on the single tone and still maintain the BER for the information bits transmitted on that tone. The SNR margin of a tone depends on the transmitted signal power on the tone, the attenuation experienced by the signal on the tone, the receiver's noise power on the tone, the coding gain achieved by use of any coding schemes, and the constellation size on the tone (or equivalently the number of bits on the tone). If all else remains equal, increasing the transmitted signal power raises the SNR margin. If all else remains equal, increasing the number of bits lowers the SNR margin.

The transmitted signal power of a tone depends on scaling operations performed on the transmitter. The transmitted signal power is affected by per tone operations for fine gain scaling (for example, gi factors according to some standards), transmit spectrum shaping (for example, tssi factors according to some standards) and other tone-dependent scaling operations such as "coarse" gain scaling (for example initial or reference flat PSD levels used in initialization in some standards). The transmitted signal power level with no fine gain scaling (gi=1), with no transmit spectrum shaping (tssi=1), and with no other tone-dependent scaling, typically is referred to as the nominal transmitted signal power level. DSL transmitters typically employ various scaling operations in the digital and analog transmission path that can affect the nominal transmitted signal power level.

The transmitted signal power of a tone (for example, using an energy table showing energy per tone) and the number of bits on a tone are configurable by the DSL system and are set by a DSL device such as a modem, DSLAM, etc. using a bit loading sub-method, algorithm, etc. These quantities are configured for the first time during initialization (also known as training) of the DSL system. These quantities can be updated during the time of normal operation of the DSL system (also known as SHOWTIME).

The transmitted signal power of a tone and the number of bits on a tone are typically selected to meet certain constraints. Typical constraints include the requirement that the data rate must be equal to or larger than a minimum data rate, and that the data rate cannot exceed a maximum data rate. Additional constraints can include the requirement that the transmitted signal power on a tone must not exceed a PSD mask, and that the aggregate transmitted signal power over all tones not exceed a maximum aggregate transmitted signal power over all tones.

Within these constraints, the DSL system selects the transmitted signal power of a tone and the number of bits on a tone based on service priorities, which are the set of criteria that are optimized or improved in configuring these two parameters. One example of service prioritization is:

Maximize data rate; and
Minimize worst-case SNR margin with respect to a maximum SNR margin. A second service prioritization example is:

Maximize data rate; and
Minimize per tone SNR margin for each used tone with respect to a maximum SNR margin. These two service priorities differ in the way they deal with SNR margin per tone. The second service priority specifies that the transmitted signal power and number of bits should be selected for each tone so that the resulting SNR margin for that tone remains smaller than a maximum SNR margin or, in cases where constraints of the implementation or applicable standard may not facilitate strict compliance with the maximum SNR margin for a tone, then the modem would elect to minimize the excess with respect to this maximum SNR margin. In other words, when this objective is met, excessively large values for SNR margin are avoided, where the definition of excessiveness relies on the configured value of maximum SNR margin. A DMT based DSL system that implements this second service priority scheme can be referred to as a system that supports margin cap mode.

Thus, according to embodiments of the present invention, a DSL device may have multiple bit loading sub-methods from which to choose in implementing multiple service priorities and/or in other situations. The present invention provides methods, apparatus, etc. that enable a DSL device to select which bit loading sub-method will be used, depending on direct instructions/controls and/or suggestions/inferences provided to the DSL device by the system in which the device operates, which can, in some embodiments, include a DSL manager of some kind One or more of the available bit loading sub-methods can be required by an applicable DSL or other communications standard, while one or more other bit loading sub-methods available to the DSL device can be a bit loading sub-method programmed into the DSL device by the device manufacturer and/or programmed into a chipset incorporated into the DSL device. Other types of and sources for bit loading sub-methods will be known and apparent to those skilled in the art. The DSL device can obtain the information needed to make a decision about a bit loading sub-method by reading an interface in the DSL system in which the DSL device operates.

Complying with the objective to minimize per-tone SNR margin for each used tone, with respect to a maximum SNR margin, yields very important benefits. It is well known to those skilled in the art that DSL systems with excessive SNR margin on some or all tones do not provide substantially more reliable communication compared to DSL systems that avoid such excessive SNR margin. In other words, excessive SNR margin provides no substantial incremental benefit for protecting a DSL system against DSL impairment sources, for example impulse noise, abrupt noise variance changes, etc. Thus, excessive SNR margin use in a DSL system has only the negative effects of increasing that DSL system's power consumption, and increasing the crosstalk inflicted on other DSL systems caused by the higher transmitted signal power.

Consequently, substantial benefits can be realized in DSL systems using embodiments of the present invention, wherein the transmitted signal power on a tone and/or the number of bits on a tone can be selected to meet the requirement of minimizing per tone SNR margin for each used tone with respect to a maximum SNR margin. DSL systems employing such methods, or DSL systems incorporating such systems can greatly benefit from reducing their power consumption, and from mitigating the crosstalk that they induce on other DSL systems.

Embodiments of the present invention can be implemented in one or more DSL devices, such as transceiver components of a DSL system (for example, one or more of the transceivers in the systems shown in FIGS. 1-7B), including (but not limited to) a DSLAM, a CPE, a Residential Gateway (RG), a modem, a DSL Central Office chipset, a DSL Customer Premises chipset, an xTU-R, an xTU-C, an ATU-R, an ATU-C, a VTU-O, a VTU-R, an Access Node, a Network Terminal, a Network Element, a Remote Terminal, etc. Any one of these devices, and any similar transceiver type of device, may be referred to as a DSL device herein.

The requirement of preserving the SNR margin of a tone to values smaller than a maximum SNR margin for all tones presents several challenges in DSL systems. A first set of challenges relates to constraints in the selection of the transmitted signal power of a tone and the number of bits of used in connection with that tone. The number of bits carried by a tone typically is limited as follows:

the number of bits must typically be an integer;
there may be a bits per tone maximum value (typically bi_max=15) that may be frequency-dependent in some advanced implementations, such as those disclosed in U.S. Ser. No. 10/893,826, filed 19 Jul. 2004, which is incorporated herein by reference in its entirety for all purposes, and International Application Serial No. PCT/US2006/026796, filed 8 Jul. 2006, which is incorporated herein by reference in its entirety for all purposes; and
when the number of bits is non-zero, there may be a minimum allowed value (bi_min=2 in ADSL1 or bi_min=1 in other DSL standards). The transmitted signal power per tone can be controlled by:

the nominal transmitted signal power level;
fine gains (gi); and/or
transmit spectrum shaping (tssi). Each of these quantities has a minimum allowed value, a maximum allowed value, and one or more intermediate values based on a step size. Additionally gi and tssi can have the value zero. For example, in ADSL1, gi has a range between 0.1888 and 1.33, is represented by 12 bits, and is also allowed to have the special value of 0.

During DSL system initialization, the transmitted signal power per tone and the number of bits of a tone are selected and any applicable constraints must be met. Techniques for meeting the additional requirement of preserving an SNR margin per tone below a maximum SNR margin during initialization are described below.

After initialization, the DSL receiver's noise power on one or more tones may change. This can happen because of time-variation of noise, caused by for example a new source of noise, a crosstalk or interference source being turned off, or a temperature change in the DSL receiver's analog front end. After such a noise change, the SNR margin on one or more tones may correspondingly change. Consequently, the maximum SNR margin requirement might not hold for certain tones and the SNR margin then must be restored to a compliant level. Techniques for restoring such compliance also are described below.

As explained above, complying with a maximum SNR margin limit (sometimes referred to as MAXSNRM) also requires that the transmitted signal power stay within its allowed range, especially for those tones where the number of bits is positive. As an example, in ADSL1, the transmitted signal power on a tone with bi>0 can range as imposed by the range of the fine gains (−14.5 dB to 2.5 dB), which for a nominal PSD level of −40 dBm/Hz translates into −54.5 dBm/Hz to −37.5 dBm/Hz. For such earlier systems and techniques, such a range may prove inadequate for eliminating excess SNR margin based on techniques for transmitted signal power reduction.

Using embodiments of the present invention, however, a DSL device can select which bit loading sub-method it will use by using one or more of the embodiments shown in FIG. 15. Initialization of the DSL device begins at 1510 and operational data is obtained at 1520, for example from an interface in the overall DSL system in which the DSL device operates. This operational data might include an explicit control signal, command, instruction, etc. that controls which bit loading sub-method the DSL device uses. On the other hand, the obtained operational data might instead provide a suggestion and/or inference to the DSL device, suggesting which bit loading sub-method to use. Finally, the operational data might be a parameter vector or the like that contains information which is processed by the DSL device to make its selection. The operational data, in some embodiments, might be provided by a DSL manager. At 1530 the bit loading sub-method is selected by the DSL device, based on the operational data previously obtained. The bit loading and energy table determination is performed at 1540, along with any other initialization steps and the DSL device begins operating at 1550 using the selected bit loading sub-method. It is possible in some embodiments of the present invention that the DSL device might update/change its bit loading sub-method during SHOWTIME operation at 1560, though this in many cases can cause the DSL line on which the DSL device is operating to fail. Method(s) 1500 can be used each time the DSL device initializes, if desired.

Figure 16A:
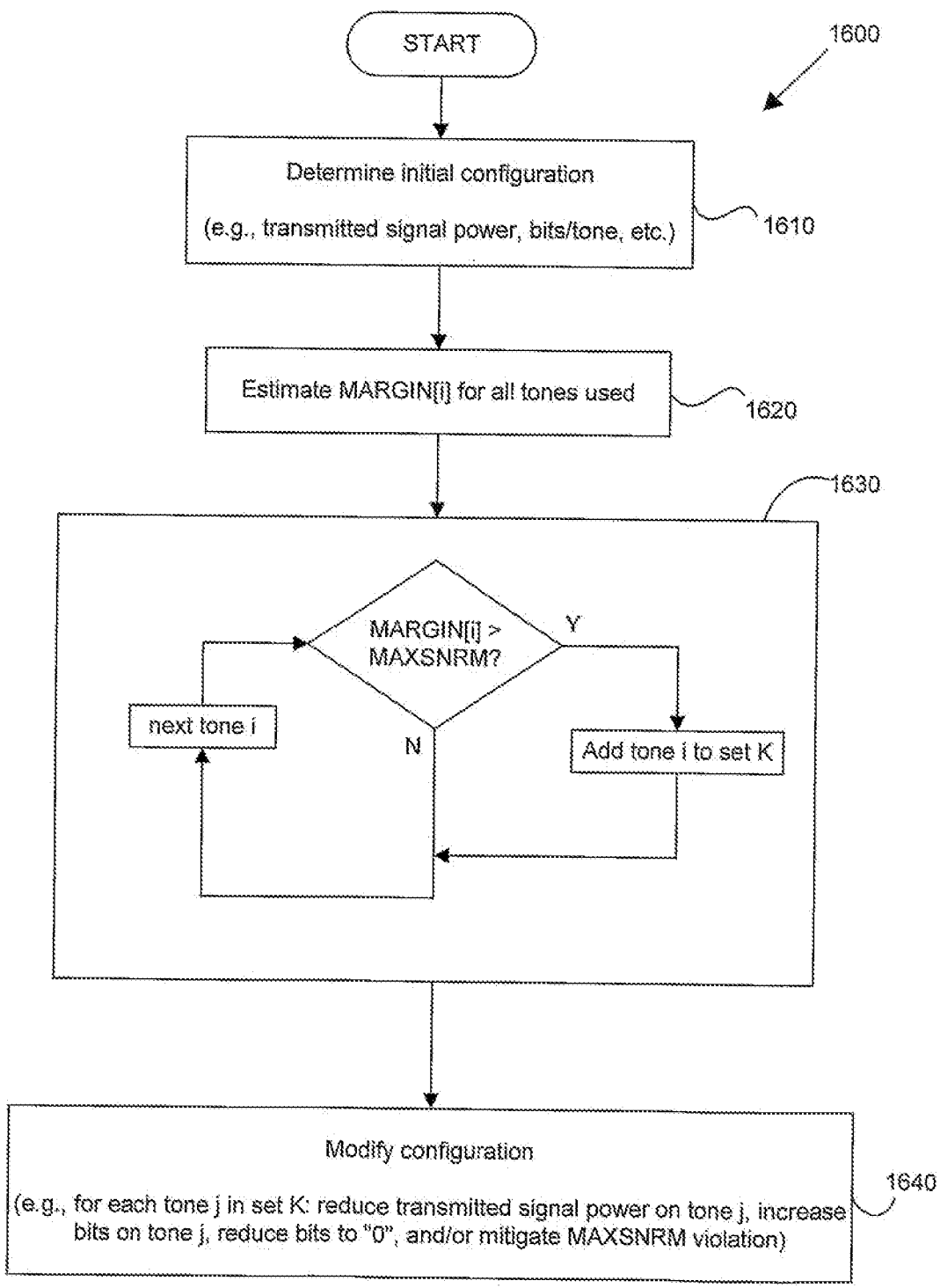
FIG. 16A illustrates a DSL system attempting to comply with a per tone maximum SNR margin requirement during initialization according to one or more embodiments of the present invention.

When using a bit loading sub-method that has maximum SNR margin compliance as one of its goals, a DSL system can attempt to comply with the per tone maximum SNR margin requirement during initialization by following one or more methods shown in FIG. 16A:

1. At 1610, determining the initial configuration for transmitted signal power and number of bits per tone (can be performed using one or more techniques well known to those skilled in the art), the output of such determination including parameters such as bi, gi, tssi, NOMPSD, PCB, etc.

2. At 1620, estimating SNR margin (MARGIN[i]) on every used tone i (the estimation, which can be performed using tables, of the SNR margin on a used tone i is based on at least one of the following: transmitted signal power on the tone, attenuation experienced by the signal on the tone, received signal power on the tone, the receiver's noise power on the tone or the minimum mean-square distortion or error on that tone, coding gain achieved by use of any coding schemes, and/or the number of bits on the tone).

3. At 1630, find tones violating MAXSNRM by comparing MARGIN[i] on every used tone i to MAXSNRM. If no tone exceeds MAXSNRM, then the procedure concludes; the initialized DSL system complies with MAXSNRM on all tones. If one or more tones exceed MAXSNRM, then the identified tones can, for example, constitute a set K.

Figure 16B:
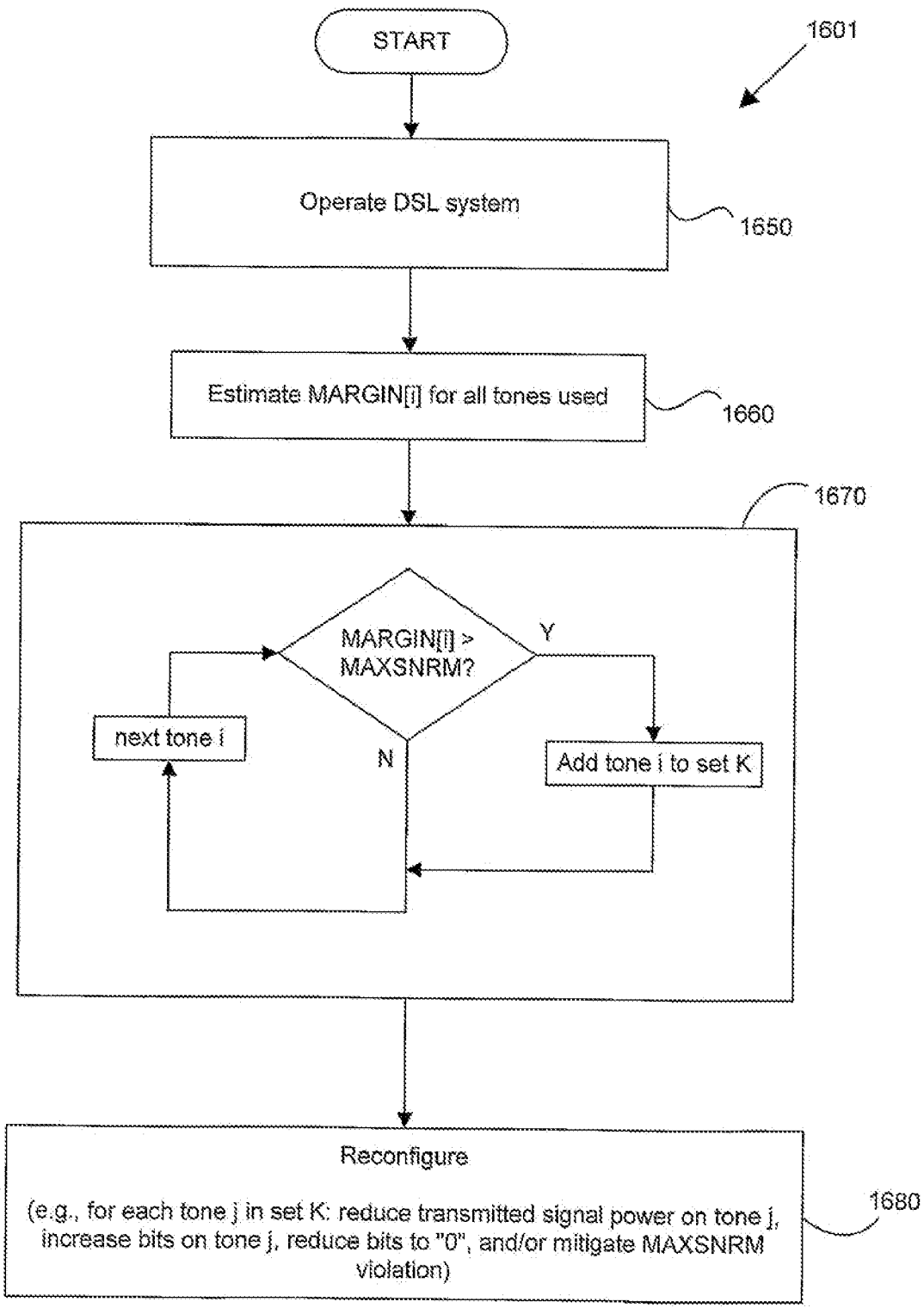
FIG. 16B illustrates a DSL system attempting to comply with a MAXSNRM requirement during SHOWTIME according to one or more embodiments of the present invention.

4. At 1640, modifying the transmitted signal power level and/or the number of bits. As an example, a tone j is selected from the set K, and at least one of the following actions might then be performed:

a. Reduce transmitted signal power on tone j using available scaling. (For example, reduce gi, if the scaling factor to be reduced is not already at its minimum allowed value. For gi in ADSL1, this minimum possible value would be −14.5 dB.) Reducing transmitted signal power reduces the SNR margin. An initial power-back-off of the transmitter power or power spectral density mask may also be requested during initialization to establish the SNR margin at desired values.

b. Increasing the number of bits (if not already at a maximum) on tone j by at least one reduces the SNR margin. Increasing the number of bits on tone j must be matched by a corresponding decrease of the number of bits on one or more tones other than the tones in set K. In one embodiment, a tone for which the number of bits is decreased (denoted as a member of set L) can be chosen as follows:

i. If it is estimated that MARGIN[i] would still remain below MAXSNRM after decreasing the number of bits on a tone, then the tone is assigned to set L.

ii. If no tones can be found satisfying (i), above, then one or more tone are chosen for which the number of bits is decreased to 0. Such tones then become unused, and a MAXSNRM requirement no longer applies for them.

c. In some cases, the MARGIN[i] might fail to be below MAXSNRM on any or all tones. In this case, the number of bits and power level on each of the tones can be adjusted to mitigate MAXSNRM violation A DSL system may comply with MAXSNRM during showtime when the noise environment changes by following one or more methods according to embodiments of the present invention, for example one or more shown in FIG. 16B:

1. At 1660, estimating SNR margin (MARGIN[i]) on every used tone i (the estimation, which can be performed using tables, of the SNR margin on a used tone i is based on at least one of the following: the transmitted signal power on the tone, the attenuation experienced by the signal on the tone, the received signal power on the tone, the receiver's noise power on the tone, the coding gain achieved by use of any coding schemes, and the number of bits on the tone. This estimation can be dynamically updated during SHOWTIME by any one of many techniques well known to those skilled in the art.

2. At 1670, find tones violating MAXSNRM by comparing determined (for example, measured and/or estimated)

MARGIN[i] on every used tone i to MAXSNRM. If no tone exceeds MAXSNRM, then the procedure goes back to 1, above; the operating DSL system complies with MAXS-NRM on all tones at present. If one or more tones exceed MAXSNRM, then the identified tones can, for example, constitute a set K.

3. At 1680, reconfiguring the DSL system (for example, the transmitted signal power and/or bits/tone). As an example, a tone j is selected from the set K, and at least one of the following actions might then be performed: [0233]

a. Reduce transmitted signal power on tone j using available scaling. (For example, reduce gi, if the scaling factor to be reduced is not already at its minimum allowed value. For gi in ADSL1, this minimum possible value would be −14.5 dB.) Reducing transmitted signal power reduces the SNR margin. If the SNR margin requirements cannot be met, the modem may also elect to use lower initial power levels (if available) during any subsequent re-initialization. The nominal mode of operation is that indications to use margin-cap mode are inferred or explicitly conveyed during the first phase of training and then applicable for all subsequent activity including showtime. Continued use would be inferred or conveyed at the beginning of the next retrain.

b. Increasing the number of bits (if not already at a maximum) on tone j by at least one reduces the SNR margin. In a known reconfiguration mode called bit-swapping, the increase of the number of bits on tone j must be matched by a corresponding decrease of the number of bits on tones other than the tones in set K. For some types of reconfiguration (for example, seamless rate adaptation), the increase of the number of bits for tone j does not need to be matched by a corresponding decrease on other tones. In one embodiment, a tone for which the number of bits is decreased (denoted as a member of set L) can be chosen as follows: [ i. If it is estimated that MARGIN[i] would still remain below MAXSNRM after decreasing the number of bits on a tone, then the tone is assigned to set L.

ii. If no tones can be found satisfying (i), above, then one or more tone are chosen for which the number of bits is decreased to 0. Such tones then become unused, and a MAXSNRM requirement no longer applies for them.

In connection with embodiments of the present invention, it typically is advantageous for a DSL system on which the DSL device is operating to be able to indicate to a manager (for example, a management system, one or more other components or elements in a DSL network, a human operator, etc., which can include one of the entities depicted in FIG. 6A or FIG. 6B) that the subject DSL system is capable of complying with a MAXSNRM requirement for every used tone. Such indication can inform a manager that this requirement is met during initialization, during SHOW-TIME, or during both. A manager or other element of a DSL Network having such an indication may then apply spectrum management techniques appropriate for the supplied indication to the DSL system.

An indication can assume a number of forms, as will be appreciated by those skilled in the art. An indication can consist of a single bit reporting MAXSNRM compliance, such as the bit referenced in U.S. Ser. No. 10/893,826, filed 19 Jul. 2004, which is incorporated herein by reference in its entirety for all purposes, and International Application Serial No. PCT/US2006/026796, filed 8 Jul. 2006, which is incorporated herein by reference in its entirety for all purposes. Alternatively, the indication may consist of a bit-field reporting the service priority followed by the DSL system, wherein the service priority includes the maximum SNR margin requirement. In other embodiments of the present invention, such an indication can be denoted as "band preference" or "margin cap mode" compliance. Finally, an indirect indication of compliance with the MAXSNRM requirement can be provided through DSL system identification. In cases where the DSL system correctly reports "inventory" information such as system vendor, chipset vendor, g.hs vendor, firmware version, software version, hardware version, serial number, etc., a manager or other DSL network component can use a look-up table to match the DSL system to an assembled list of DSL systems that are known to comply with the requirement. This "inventory information" and other similar information pertaining to equipment used in a given DSL system also might be found and/or determined in other ways and may be used as "equipment information" in connection with embodiments of the present invention.

In connection with embodiments of the present invention, it also typically is advantageous for a DSL system to provide and/or have available a corresponding control for enabling the capability to comply with a MAXSNRM requirement for every used tone. Such a control can be used by a manager to enable this requirement selectively on certain DSL modems, for example modems and/or other DSL devices utilizing one or more embodiments of the present invention in selecting a bit loading sub-method to implement. A manager can enable this requirement, which can be implemented when a DSL device obtains operational data according to embodiments of the present invention, only for those DSL modems and/or other devices where reduction of excess SNR margin and the corresponding reduction of consumed power and induced crosstalk is valuable. For example, if enabling this capability results in undesired data rate reductions for some modems, then the manager might choose to have it disabled by suggesting to or expressly instructing a DSL device to select a different bit loading sub-method.

There are a number of ways for DSL equipment to implement MAXSNRM, irrespective of the presence or absence of a manager and/or the presence or absence of a mechanism to communicate with the manager. This means that a DSL device implementing an embodiment of the present invention can obtain a suggestion, inference, etc. from the operational data obtained by the DSL device through a mechanism other than direct communication with a DSL manager on the device's DSL system. Such mechanisms for communication are the subject of the ATIS DSM Technical Report and the G.994.x ITU Handshake, G.HS standards as well as the G.997.1 Physical Layer Operations and Maintenance, G.PLOAM standard and the various national and international ADSL and VDSL standards, the information of which is well known to those skilled in the art. If a manager is present, it can use one or more technique for determining and/or estimating whether margin cap mode and/or band preference is implemented. Three of these techniques permit at least an inferred answer to the question "Does the DSL system support margin cap mode?" as follows:

1—An interface between the manager and one or more DSL systems queries with respect to support and receives one of 3 responses or no response as follows: (1) Yes, I support margin cap mode and it is on, (2) Yes, I support margin cap mode and it is off, (3) No, I do not support margin cap mode, or (4) "no response" (which might be interpreted by the manager as, "No, I do not support margin cap node.").

2—Defaults are known for certain types of equipment, as suggested above, and equipment supporting margin cap mode always defaults to having margin cap mode turned on;

those not supporting margin cap mode are presumed to default to not having margin cap mode turned on.

3—The manager observes the reaction to various other profile commands to the modem (for example, as disclosed in U.S. Ser. No. 10/817,128, filed 2 Apr. 2004, which is incorporated herein by reference in its entirety for all purposes) and infers (during and/or after the observation interval) whether or not the DSL appears to be implementing margin cap mode. This no-interface implementation would observe modems that would choose to implement or not implement margin cap mode (dynamically or static to a product) and presume the indication would be inferred other behavior reported from the line to the manager. Such a DSL modem implementation that alters or chooses enabling margin cap mode so that a manager can observe and thus react is a significant improvement to earlier systems in which MAXSNRM was largely ignored, implemented arbitrarily and did not conform to imposition of MAXSNRM over all used tones. Embodiments of the present invention thus allow implementation of margin cap mode with no express interface between a DSL line and the manager. This inquiry may be made separately for downstream and upstream transmission.

When a DSL system is known to support margin cap mode, the manager also could then provide a command or control indication to the DSL line to "turn on" or "turn off" (in which case the manager can presume that the modem returns to an observable state that might be presumed to be that the MAXSNRM only applies to the worst tone or tones of use by the DSL). This indication interface has been referred to as "band preference" but may be known by other names like "margin cap mode."

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

FIG. 17 illustrates a typical computer system that can be used by a user and/or controller in accordance with one or more embodiments of the present invention. The computer system 1700 includes any number of processors 1702 (also referred to as central processing units, or CPUs) that are coupled to storage devices including primary storage 1706 (typically a random access memory, or RAM), primary storage 1704 (typically a read only memory, or ROM). As is well known in the art, primary storage 1704 acts to transfer data and instructions uni-directionally to the CPU and primary storage 1706 is used typically to transfer data and instructions in a bi-directional manner. Both of these primary storage devices may include any suitable of the computer-readable media described above. A mass storage device 1708 also is coupled bi-directionally to CPU 1702 and provides additional data storage capacity and may include any of the computer-readable media described above. The mass storage device 1708 may be used to store programs, data and the like and is typically a secondary storage medium such as a hard disk that is slower than primary storage. It will be appreciated that the information retained within the mass storage device 1708, may, in appropriate cases, be incorporated in standard fashion as part of primary storage 1706 as virtual memory. A specific mass storage device such as a CD-ROM may also pass data uni-directionally to the CPU.

CPU 1702 also is coupled to an interface 1710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1702 optionally may be coupled to a computer or telecommunications network using a network connection as shown generally at 1712. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a controller may be stored on a mass storage device and executed on CPU 1702 in conjunction with primary memory 1706. In one embodiment of the present invention, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of operating a DSL system, the method comprising:
   using a communication between two or more components in a DSL system to associate an operational parameter with a timestamp that defines an event that is associated with at least a phase among a plurality of phases that identifies an operational mode of the DSL system, the operational mode comprising at least one of diagnostics or normal initialization;
   appending the timestamp after the operational parameter; and
   using the operational parameter in operating the DSL system.

2. The method of claim 1 wherein the time stamp comprises a time reference that comprises a point in time defined by at least one of the following: absolute time; relative to one or more phase transitions; or relative to one or more phase-defined events.

3. The method of claim 1 wherein the operational parameter is a control parameter used in an update operation of the DSL system.

4. The method of claim 3 wherein the timestamp comprises at least one of the following: information regarding whether the update operation will force initialization; information regarding when the update operation will be enforced and/or implemented; or information regarding any delay between a known time reference and the enforcement and/or implementation of the update operation.

5. The method of claim 1 wherein appending the operational parameter comprises associating the timestamp with a name for the operational parameter and a value for the operational parameter.

6. The method of claim 1 further comprising: grouping a plurality of operational parameters; and appending the timestamp to the plurality of operational parameters.

7. The method of claim 1 further comprising: defining a plurality of time markers; wherein appending the timestamp to the operational parameter comprises associating one of the plurality of time markers to the operational parameter.

8. The method of claim 1 wherein the timestamp is associated with a name and a value of the operational parameter.

9. The method of claim 1 wherein the two or more components have a common time reference.

10. The method of claim 1 further comprising using the timestamp to synchronize the communication between the two or more components.

11. The method of claim 1 wherein the two or more components, in periodical intervals, exchange a message comprising the time stamp.

12. The method of claim 1 wherein the two or more components communicate with a delay that does not affect an accuracy of the timestamp.

13. The method of claim 1 wherein the timestamp is based on a synchronizing event between the two or more components in the DSL system.

14. The method of claim 1 further comprising using two timestamps to obtain a duration of the event.

15. The method of claim 1 further comprising the timestamp to obtain a time between two events.

16. The method of claim 1 wherein the timestamp is indicative of a time of measurement of the operational parameter.

* * * * *